United States Patent [19]
Nakamikawa et al.

[11] Patent Number: 5,841,963
[45] Date of Patent: Nov. 24, 1998

[54] DUAL INFORMATION PROCESSING SYSTEM HAVING A PLURALITY OF DATA TRANSFER CHANNELS

[75] Inventors: Tetsuaki Nakamikawa; Shin Kokura; Kenichi Kurosawa, all of Hitachi; Shinichiro Yamaguchi, Mito; Yoshihiro Miyazaki, Hitachi; Hiroshi Ohguro, Hadano, all of Japan

[73] Assignee: Hitachi, Ltd., Tokyo, Japan

[21] Appl. No.: 861,471

[22] Filed: May 21, 1997

Related U.S. Application Data

[63] Continuation of Ser. No. 471,989, Jun. 6, 1995, abandoned.

[30] Foreign Application Priority Data

Jun. 8, 1994 [JP] Japan ..................................... 6-126562

[51] Int. Cl.⁶ .............................. G06F 11/16; G06F 15/17
[52] U.S. Cl. ................................. 395/182.09; 395/182.04; 395/182.1; 395/182.11; 395/200.3; 395/200.43
[58] Field of Search ........................ 395/182.09, 182.04, 395/182.05, 182.06, 182.07, 182.08, 182.1, 182.11, 200.3, 200.38, 200.39, 200.42, 200.43, 200.44, 200.45, 200.57, 200.61, 200.62, 200.68, 200.69

[56] References Cited

U.S. PATENT DOCUMENTS

| | | | |
|---|---|---|---|
| 3,710,349 | 1/1973 | Miwa et al. | 711/100 |
| 4,466,098 | 8/1984 | Southard | 395/182.1 |
| 4,709,325 | 11/1987 | Yajima | 395/182.08 |
| 4,959,768 | 9/1990 | Gerhart | 395/182.11 X |
| 5,016,160 | 5/1991 | Lambeth et al. | 395/844 |
| 5,123,099 | 6/1992 | Shibata et al. | 711/120 |
| 5,202,980 | 4/1993 | Morita | 395/182.09 |
| 5,255,367 | 10/1993 | Bruckert | 395/182.09 |
| 5,343,427 | 8/1994 | Teruyama | 395/189.04 |
| 5,418,938 | 5/1995 | Hatanaka | 395/182.09 |
| 5,588,112 | 12/1996 | Dearth et al. | 395/182.07 |

FOREIGN PATENT DOCUMENTS

0411805A2  6/1991  European Pat. Off. .

OTHER PUBLICATIONS

Khan et al. "RSM—a restricted shared memory architecture for high speed interprocessor communication"; Microprocessor & Microsystem Journal, vol. 18, No. 4, pp. 193–203, May 1994.

*Primary Examiner*—Dieu-Minh Le
*Attorney, Agent, or Firm*—Pennie & Edmonds LLP

[57] ABSTRACT

A dual computer system consisting of two computer systems connected by a plurality of data transfer units and a plurality of data transfer channels for a memory copy made to again synchronize both the computer systems at the time of recovery from a fault. When no fault occurs on the data transfer channels, the data transfer units share the load of data transfer in the memory copy operation, and when a fault occurs on any data transfer unit during the memory copy operation, the remaining normal data transfer units are used to again transfer data, whereby a memory copy is made at high speed for again synchronizing both the computer systems at the time of recovery from a fault, and system reliability at the time of recovery from a fault is improved.

1 Claim, 23 Drawing Sheets

FIG. 2A

| CPY | AVL0 | AVL1 | AVL2 | AVL3 |
|---|---|---|---|---|

FIG. 2B

| CPY | OPERATION |
|---|---|
| 0 | MAKE NO MEMORY COPY |
| 1 | MAKE A MEMORY COPY |
| AVLi (i=0,3) | DESCRIPTION |
| 0 | iTH DT CANNOT BE USED |
| 1 | iTH DT CAN BE USED |

FIG. 2C

Tid OF DT ISSUED

| AVL0 | AVL1 | AVL2 | AVL3 | BITS 25,26 OF ADDRESS | | | |
|---|---|---|---|---|---|---|---|
| | | | | 00 | 01 | 10 | 11 |
| 0 | 0 | 0 | 0 | — | — | — | — |
| 0 | 0 | 0 | 1 | 3 | 3 | 3 | 3 |
| 0 | 0 | 1 | 0 | 2 | 2 | 2 | 2 |
| 0 | 0 | 1 | 1 | 2 | 3 | 2 | 3 |
| 0 | 1 | 0 | 0 | 1 | 1 | 1 | 1 |
| 0 | 1 | 0 | 1 | 1 | 3 | 1 | 3 |
| 0 | 1 | 1 | 0 | 1 | 2 | 1 | 2 |
| 0 | 1 | 1 | 1 | 1 | 1 | 2 | 3 |
| 1 | 0 | 0 | 0 | 0 | 0 | 0 | 0 |
| 1 | 0 | 0 | 1 | 0 | 3 | 0 | 3 |
| 1 | 0 | 1 | 0 | 0 | 2 | 0 | 2 |
| 1 | 0 | 1 | 1 | 0 | 0 | 2 | 3 |
| 1 | 1 | 0 | 0 | 0 | 1 | 0 | 1 |
| 1 | 1 | 0 | 1 | 0 | 1 | 3 | 3 |
| 1 | 1 | 1 | 0 | 0 | 1 | 2 | 2 |
| 1 | 1 | 1 | 1 | 0 | 1 | 2 | 3 |

| CMP 0 | CMP 1 | OPERATION |
|---|---|---|
| 0 | 0 | MAKE NO MEMORY COPY |
| 0 | 1 | MAKE A MEMORY COPY INTO ALL ADDRESSES |
| 1 | 0 | MAKE A MEMORY COPY IF BIT 26 OF ADDRESS MATCHES AD1 |
| 1 | 1 | MAKE A MEMORY COPY IF BITS 25 AND 26 OF ADDRESS MATCH AD0 AND AD1 |

| TERR | DESCRIPTION |
|------|-------------|
| 0 | NO ERROR AT MEMORY COPY |
| 1 | ERROR AT MEMORY COPY |

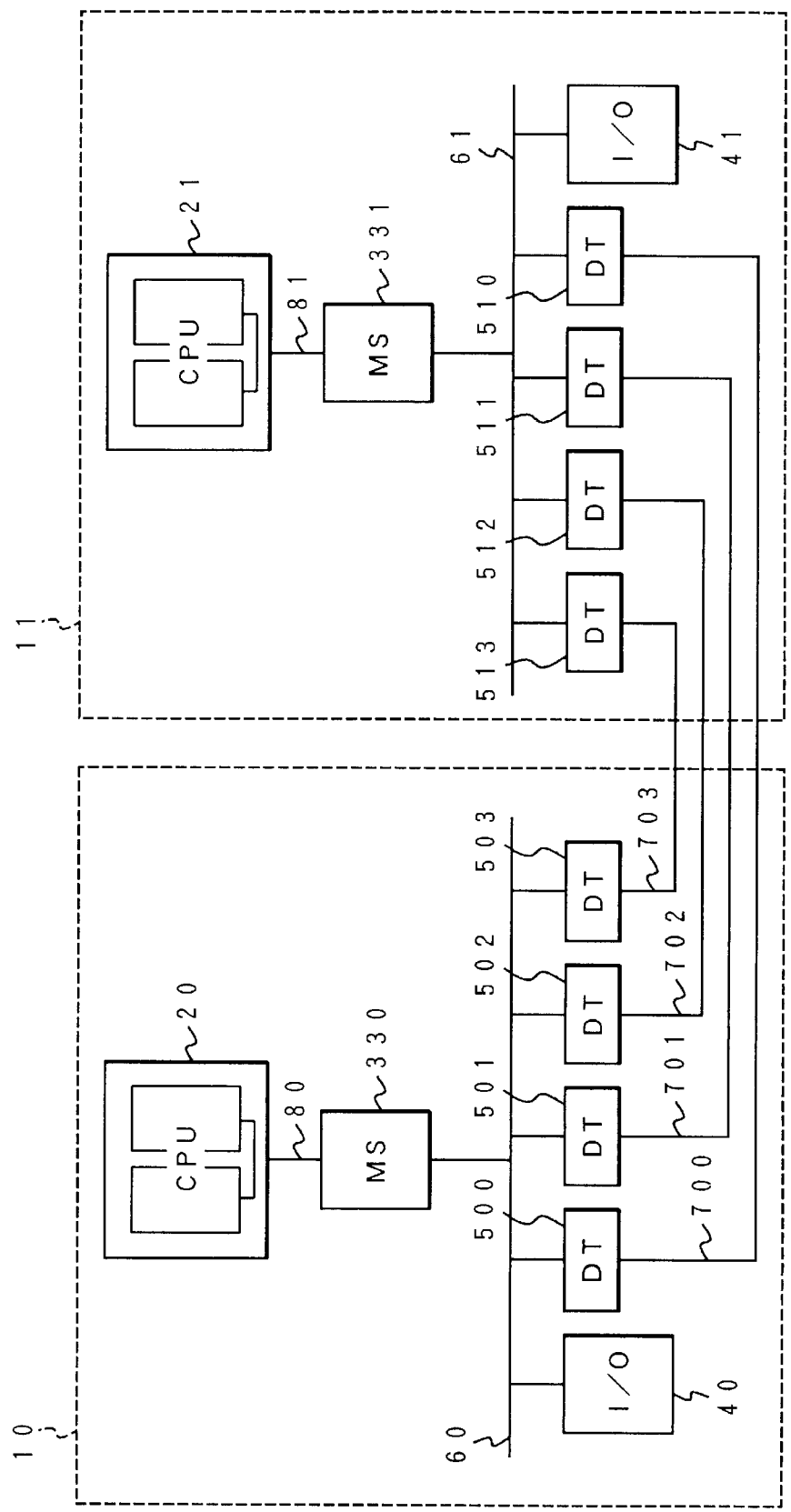
F I G. 15

DUAL INFORMATION PROCESSING SYSTEM HAVING A PLURALITY OF DATA TRANSFER CHANNELS

This is a continuation of application Ser. No. 08/471,989, filed Jun. 6, 1995, now abandoned.

BACKGROUND OF THE INVENTION

1. Field of the Invention

This invention relates to a fault-tolerant computer system having two synchronously operating computer systems wherein if fault occurs in one of the systems, the other system operates to maintain the computer system function and after the faulty system recovers from the fault, both the systems are resynchronized with each other to restart the dual operation.

2. Description of the Related Art

A memory copy method during resynchronization in a conventional dual information processing system, particularly in a computer system, is disclosed, for example, in Japanese Patent Laid-Open (KOKAI) No. Hei 3-182958.

This disclosed dual information processing system has two computer systems, each of which comprises at least a CPU (central processing unit), an MC (memory controller), a CL (cross-link controller), an I/O (input/output unit), and memory. In each system, the CPU, MC, and CL (and also a bus connecting them) are duplicated.

That is, the data transfer channel in one system (for example, data transfer channel among the memory, MC, and CL) is duplicated. The two CLs in one system are connected to the two CLs in the other system for duplicating a system-to-system data transfer channel to transmit the memory contents in one system to the memory in the other system, thus enhancing data copy reliability.

The system-to-system data transfer channel is used for a memory copy (transfer of the memory contents in one system to the memory in the other system) and an access to one system from the I/O unit in the other system.

In the related art, to make a memory copy from one system into the other system, for example, data read from the memory in one system is transferred through the CLs connected to the two MCs in the one system to the other system.

Since the two MCs perform the same operation synchronously in the system, the same data is transferred through the two CLs to the other system in the memory copy.

The two CLs in the memory copy destination system perform write operation of the received data into the memory in the home system through the MCs to which the CLs are connected, and the memory copy is completed.

Although the data transfer channel between both the systems is duplicated for improving fault tolerance at the time of memory copy in the related art, the operation performed using one of the data transfer channels is the same as the operation performed using the other. Therefore, although two data transfer channels are used, the data transfer throughput at the time of memory copy is the same as that when one data transfer channel is used. Thus, the computer system in the related art does not consider improvement in the memory copy execution speed.

SUMMARY OF THE INVENTION

It is therefore an object of the invention to provide a dual information processing system comprising a plurality of data transfer channels for sharing the load of a memory copy into a mate system for shortening the time required for the memory copy, namely, the single-system-operation time to completion of resynchronization, and improving system reliability.

It is another object of the invention to provide a dual information processing system for preventing memory copy processing from lowering processing performance in the normal system and improving reliability against data transfer unit faults.

To these ends, according to one aspect of the present invention, there is provided a dual information processing system comprising two computer systems operating synchronously with each other during normal operation, each of which has at least a central processing unit, a storage, an I/O unit, and a plurality of data transfer units for transferring data to the storage in a mate computer system, wherein when a fault occurs in one of the two computer systems, the other computer system operates independently and continues predetermined processing, the data transfer units being connected in pairs between both computer systems by a data bus.

When either of the central processing units decides that a fault occurs in one of the two computer systems, data stored in the storage in the normal computer system is transferred to (copied into) the storage in the faulty computer system for resynchronizing the operation of the faulty computer system with that of the normal computer system. At that time, the stored data is divided into several pieces of data, which is called "blocked", and blocked data is assigned to any data transfer unit for the data copy.

When the central processing unit detects fault occurring in any of the data transfer units, it may assign the blocked data to another normal data transfer unit for the data copy.

The stored data is blocked for each predetermined address range in the storage and the address ranges are uniquely related to the data transfer units assigned the blocked data existing in the address ranges.

BRIEF DESCRIPTION OF THE DRAWINGS

In the accompanying drawings:

FIGS. 2A to 2C are illustrations of the contents set in a transfer mode register in a second embodiment;

FIG. 15 is a block diagram of a dual computer system according to the second embodiment of the invention;

DESCRIPTION OF THE PREFERRED EMBODIMENTS

Referring now to the accompanying drawings, there are shown preferred embodiments of the invention.

Figure 1:
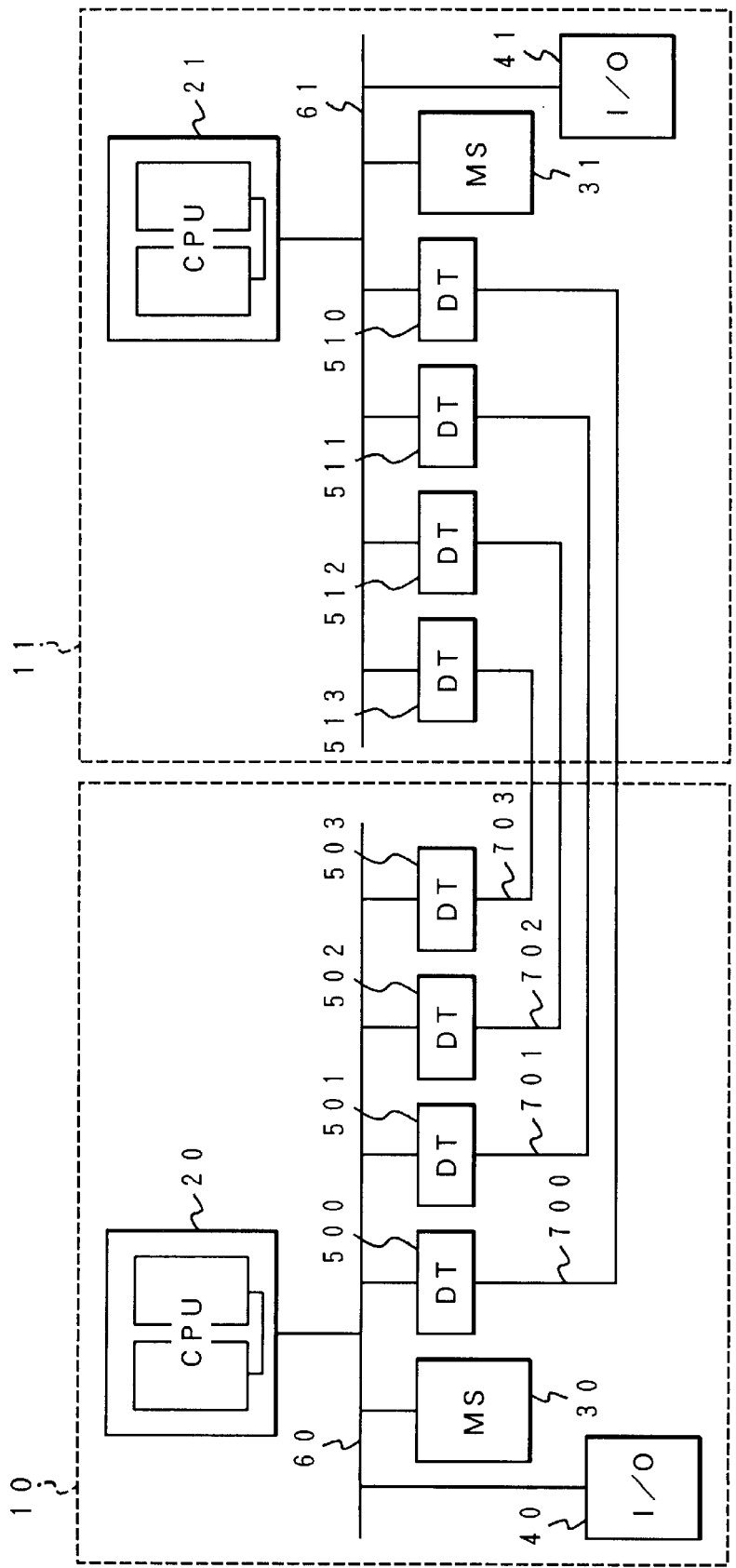
FIG. 1 is a block diagram showing the basic configuration of a dual computer system according to a first embodiment of the invention.

FIG. 1 is a block diagram showing the basic configuration of a dual computer system according to a first embodiment of the invention.

The dual computer system consists of systems 10 and 11.

The system 10 comprises a CPU (central processing unit) 20, an MS (main storage) 30, an I/O (input/output unit) 40, and data transfer units (DT 500, DT 501, DT 502, and DT 503) for transferring data to the system 11. These units are connected by a system bus 60. The units will be discussed later in detail.

The system 11 has the same configuration as the system 10.

That is, the system 11 comprises a CPU 21, an MS 31, an I/O 41, and data transfer units (DT 510, DT 511, DT 512, and DT 513) for transferring data to the system 10. These units are connected by a system bus 61.

Both the systems 10 and 11 are connected by data transfer channels 700, 701, 702, and 703.

Specifically, the DT 500 and DT 510 are connected by the data transfer channel 700, the DT 501 and DT 511 by the data transfer channel 701, the DT 502 and DT 512 by the data transfer channel 702, and the DT 503 and DT 513 by the data transfer channel 703.

Since the system 11 is the same as the system 10 in configuration and function, the description to follow centers around the configuration and function of the system 10. Unless otherwise required, the system 11 will not be discussed.

Figure 3:
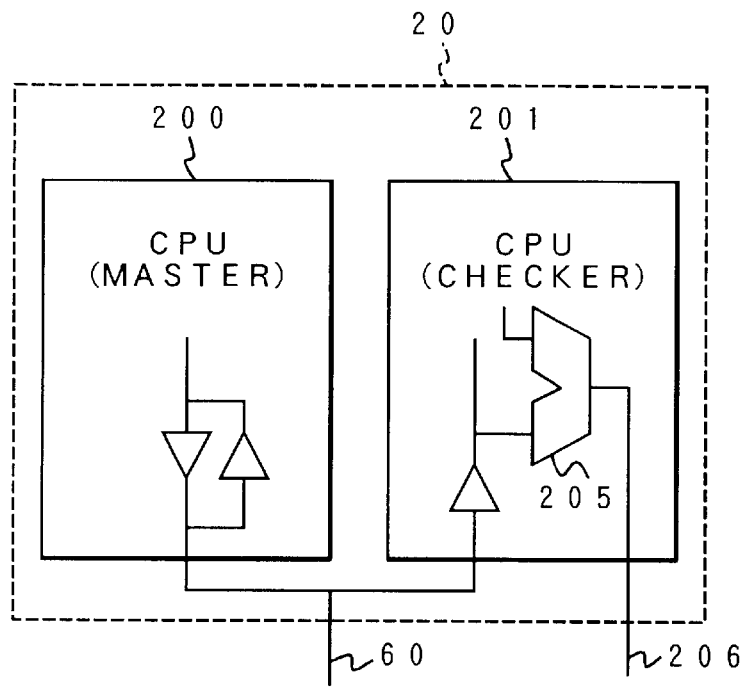
FIG. 3 is a block diagram showing an internal configuration example of a central processing unit.

FIG. 3 is a block diagram showing the internal configuration of the CPU 20.

In the embodiment, the CPU 20 has the duplicated configuration consisting of two CPUs 200 and 201. Data output by the master CPU 200 to the bus 60 is read by the checker CPU 201, which then performs comparison by an internal comparator 205 for sensing whether or not a fault occurs in the CPU 200 or 201. If the comparison results in a mismatch, a comparison error signal 206 is issued for sending fault occurrence information to, for example, the I/O. The CPU duplication method itself is not the main point of the invention and therefore will not be discussed.

Figure 4:
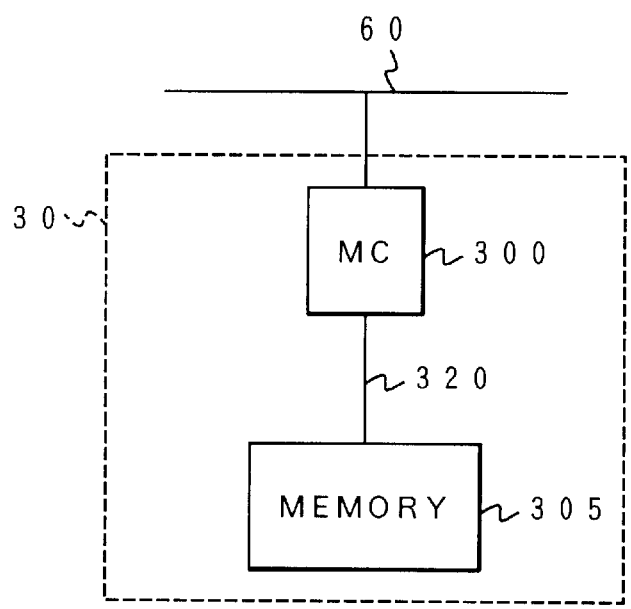
FIG. 4 is a block diagram showing an internal configuration example of a main storage.

FIG. 4 is a block diagram showing an internal configuration example of the MS 30.

The MS 30 comprises an MC 300 (memory controller) and a memory 305.

The MC 300 and the memory 305 are connected by a memory system bus 320. The memory 305 can be provided by a plurality of DRAM (dynamic random access memory) devices, for example. The MC 300 is means for controlling the data storage operation into the memory 305 and data read operation from the memory 305; it can be provided by electronic devices such as CMOS ICs, for example. The detailed configuration of the memory will not be discussed because the memory configuration, such as placement of DRAM devices like a matrix, is generally known.

Figure 5:
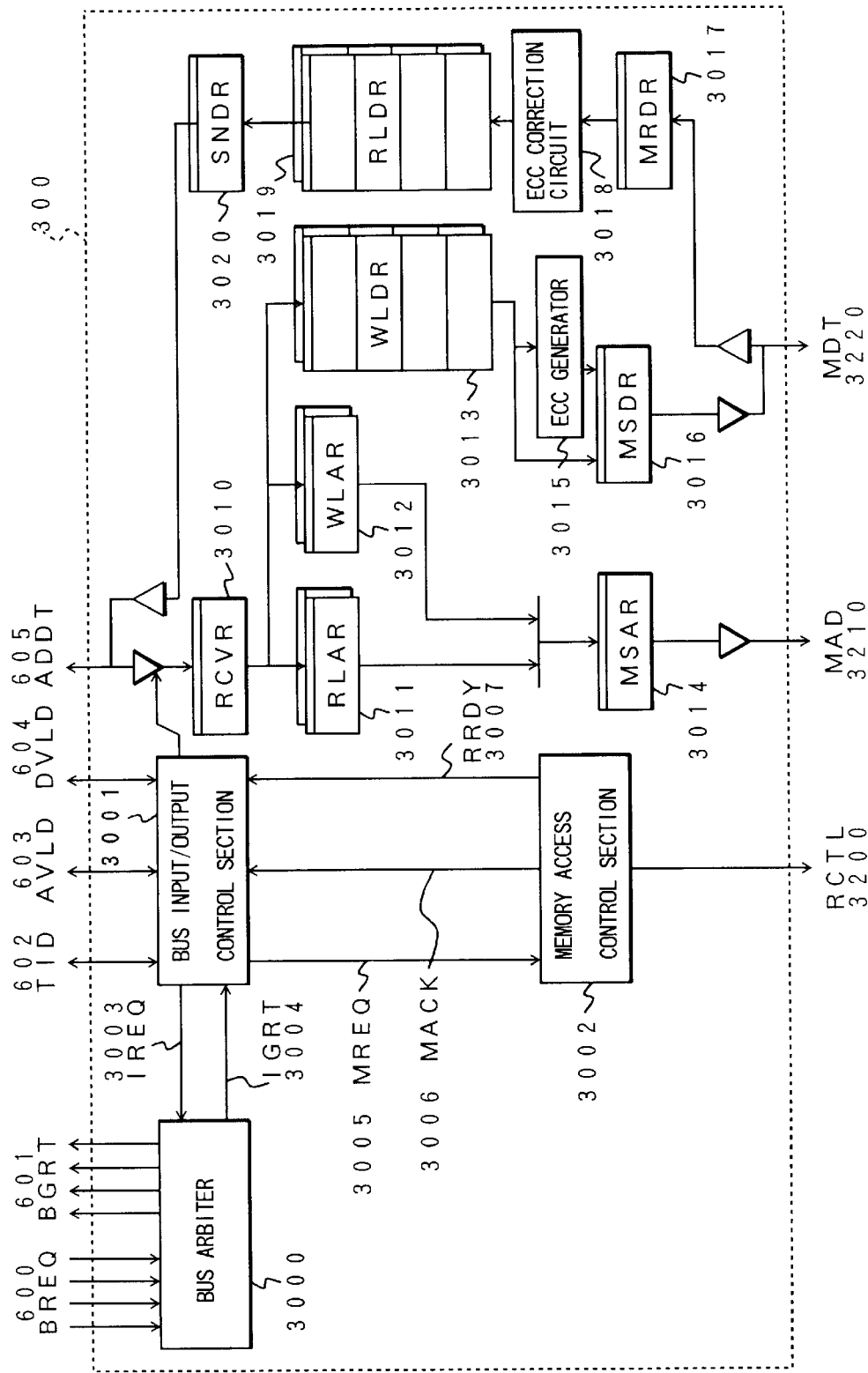
FIG. 5 is a block diagram showing a configuration example of a memory controller.

FIG. 5 is a block diagram showing a configuration example of the MC 300 (memory controller).

The MC 300 shown in FIG. 5 comprises a bus arbiter 3000, a bus input/output control section 3001, a memory access control section 3002, a receive register (RCVR) 3010, a read line address register (RLAR) 3011, a write line address register (WLAR) 3012, a write line data register (WLDR) 3013, a memory send address register (MSAR) 3014, an ECC (error correction code) generator 3015, a memory send data register (MSDR) 3016, a memory read data register (MRDR) 3017, an ECC correction circuit 3018, a read line data register (RLDR) 3019, and a send register (SNDR) 3020. The components can be provided by electronic devices such as CMOS logic circuits and RAM devices.

Bus request signal lines (BREQ) 600 and bus grant signal lines (BGRT) 601, which form a part of the system bus 60, are connected to the bus arbiter 3000. The bus request signal lines and the bus grant signal lines are also connected to the units connected to the system bus, namely, the CPU, I/O, and DTs, respectively. Now, since four DTs exist, four bus request signal lines and four bus grant signal lines exist as shown in the figure. "Bus request" means to request bus occupation and "bus arbiter" means to grant the bus occupation request.

The bus arbiter 3000 and the bus input/output control section 3001 are connected by an internal bus request signal line (IREQ) 3003 and an internal bus grant signal line (IGRT) 3004.

The bus arbiter 3000 arbitrates bus requests output from the units and internal bus requests, which mean bus requests made inside the MC 300, and informs the requesting unit that use of the bus is granted over the bus grant signal line 601 or the internal bus grant signal line 3004.

A transaction ID signal line (TID) 602, an address valid signal line (AVLD) 603, and a data valid signal line (DVLD) 604, which form a part of the system bus 60, are connected to the bus input/output control section 3001.

The bus input/output control section 3001 and the memory access control section 3002 are connected by a memory access request signal line (MREQ) 3005 for transmitting a signal requesting an access to the memory, a request acknowledge signal line (MACK) 3006 for transmitting a signal indicating that a memory access request is acknowledged, and a read data ready signal line (RRDY) 3007 for transmitting a signal indicating that read data is ready.

The embodiment assumes that when issuing a transaction onto the system bus 60, each unit should indicate as the transaction target unit using a transaction ID.

For example, when the CPU issues a transaction of "memory read," it should output the unit number of the main storage together with the memory read address onto the TID 602 as a transaction ID. The AVLD 603 is a signal indicating that an address is output onto the system bus 60 and the DVLD 604 is a signal indicating that data is output onto the system bus 60.

The bus input/output control section 3001 monitors the transaction output onto the system bus 60. If the transaction is a request issued to the bus input/output control section 3001, the control section 3001 reads it and outputs a memory access request signal to the memory access control section 3002 over the signal line MREQ 3005.

When acknowledging the request, the memory access control section 3002 returns a signal indicating that the request is acknowledged to the bus input/output control section 3001 over the signal line MACK 3006.

When data is read from the memory, the bus input/output control section 3001 is informed that the data has been read from the memory by the signal sent on the signal line RRDY 3007. Then, the bus input/output control section 3001 sends a signal on the signal line IREQ 3003 for issuing a request for bus use to the bus arbiter 3000. When the bus input/output control section 3001 is informed that bus use is granted by a signal returned from the bus arbiter 3000 over the signal line IGRT 3004, it outputs the accessed data onto the system bus 60.

A DRAM control signal line (RCTL) 3200, which forms a part of the memory system bus 320 (see FIG. 4), is connected to the memory access control section 3002. It is also connected to the memory 305 (see FIG. 4).

The RCTL 3200 comprises address strobe and bank select signal lines, etc. The memory access control section 3002 is responsive to a request from the bus input/output control section 3001 for controlling an access to the memory 305 over the RCTL 3200 for performing desired data input/output processing.

Data on an address/data signal line (ADDT) 605, which forms a part of the system bus 60, is held in the receive register (RCVR) 3010 under the control of the bus input/output control section 3001.

After this, the data held in the RCVR 3010 is held in any of the read line address register (RLAR) 3011, the write line address register (WLAR) 3012, and the write line data register (WLDR) 3013 according to the type of transaction under the control of the bus input/output control section 3001.

The addresses held in the RLAR 3011 and the WLAR 3012 are set in the memory send address register(MSAR) 3014 and sent to the memory 305 over a memory address signal line (MAD) 3210, which forms a part of the memory system bus 320, under the control of the memory access control section 3002.

The write data held in the WLDR 3013, to which an ECC generated by the ECC (error correction code) generator 3015 is added, is set in the memory send data register (MSDR) 3016 and sent to the memory 305 over a memory data signal line (MDT) 3220, which forms a part of the memory system bus 320, under the control of the memory access control section 3002.

On the other hand, data is read from the memory 305 as follows:

The data read from the memory 305 is set in the memory read data register (MRDR) 3017 via the signal line MDT 3220 under the control of the memory access control section 3002. Then, the data is passed through the ECC correction circuit 3018 and is held in the read line data register (RLDR) 3019. The data held in the RLDR 3019 is set in the send register (SNDR) 3020 and sent onto the signal line ADDT 605 under the control of the bus input/output control section 3001.

The function of the I/O unit 40 is generally well known; for example, it is used to execute PIO (peripheral I/O) access with the CPU 20 and DMA (direct memory access) to the MS 30. In the invention, the I/O unit 40 is not the main component and therefore will not be discussed in detail.

Figure 6:
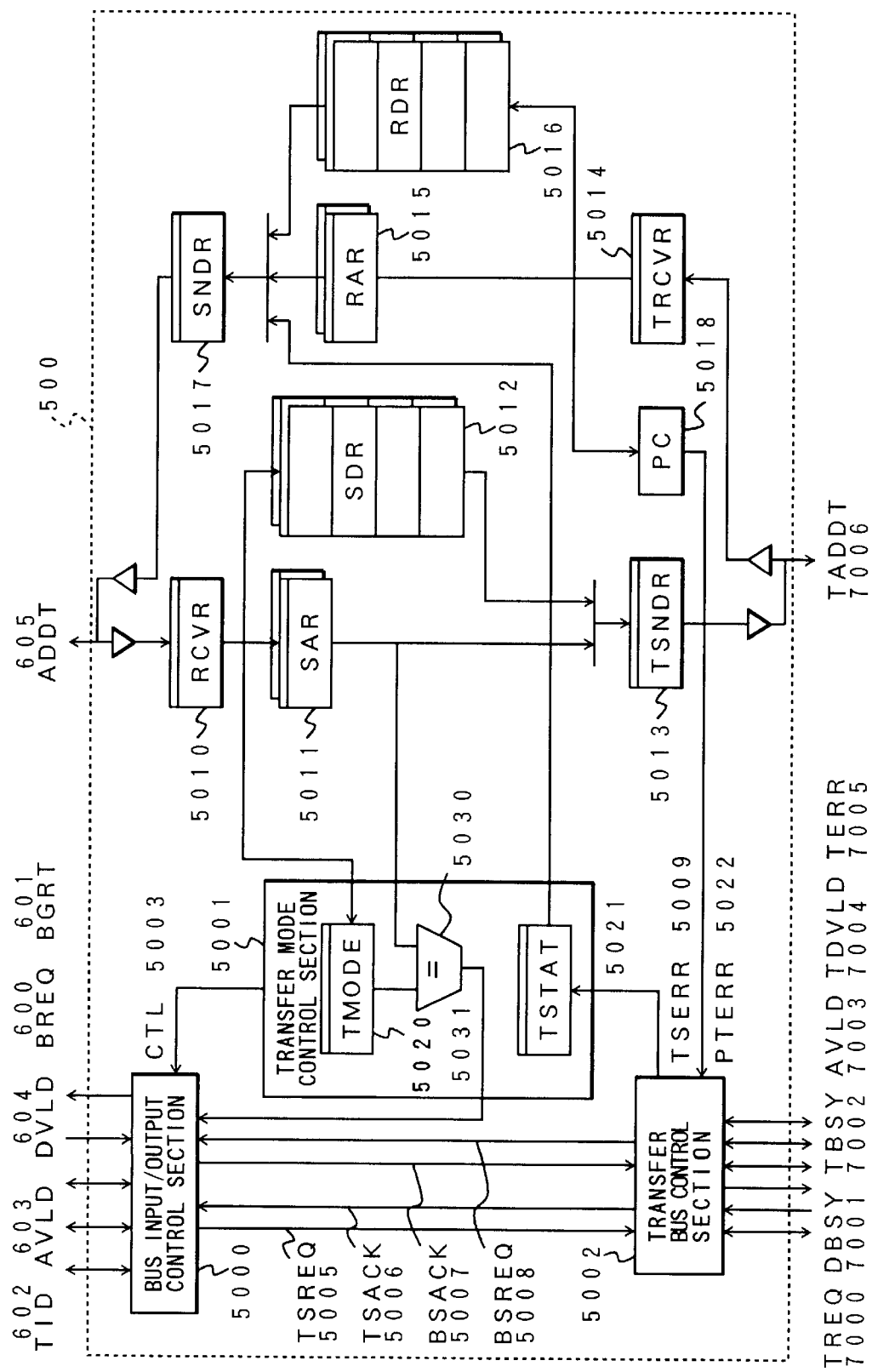
FIG. 6 is a block diagram showing a configuration example of a data transfer unit.

FIG. 6 is a block diagram showing a configuration example of the data transfer unit for transferring data to the system 11.

The data transfer units DT 500 to DT 503 have the same configuration and therefore the configuration of the DT will be discussed by taking the DT 500 as an example.

The DT 500 according to the embodiment comprises a bus input/output control section 5000, a transfer mode control section 5001, a transfer bus control section 5002, a receive register (RCVR) 5010, a send address register (SAR) 5011, a send data register (SDR) 5012, a transfer send register (TSNDR) 5013, a transfer receive register (TRCVR) 5014, a receive address register (RAR) 5015, a receive data register (RDR) 5016, a send register (SNDR) 5017, a parity check circuit (PC) 5018, a transfer mode register (TMODE) 5020, and a status register (TSTAT) 5021. As described above, other data transfer units (DT 501 to DT 503) have the same configuration as the DT 500.

The bus request signal lines (BREQ) 600, bus grant signal lines (BGRT) 601, transaction ID signal line (TID) 602, address valid signal line (AVLD) 603, and data valid signal line (DVLD) 604, which form a part of the system bus 60, are connected to the bus input/output control section 5000. The signal lines assigned the same reference numerals as those previously described with reference to FIG. 5 are the same signal lines as in FIG. 5.

The bus input/output control section 5000 and the transfer mode control section 5001 are connected by a transfer mode control signal line (CTL) 5003. Further, the bus input/output control section 5000 and the transfer bus control section 5002 are connected by a transfer request signal line (TSREQ) 5005, a transfer request acknowledge signal line (TSACK) 5006, a bus send request acknowledge signal line (BSACK) 5007, and a bus send request signal line (BSREQ) 5008.

The bus input/output control section 5000 monitors a transaction output onto the system bus 60. If the transaction is a mode setting request issued to the bus input/output control section 5000, the control section 5000 reads it from the receive register (RCVR) 5010 holding the request signal and sets it in the transfer mode register (TMODE) 5020 in the transfer mode control section 5001.

If the transaction output onto the system bus 60 is a status read request issued to the bus input/output control section 5000, the control section 5000 reads the status held in the status register (TSTAT) 5021 in the transfer mode control section 5001 and outputs it onto the system bus 60.

If the transaction output onto the system bus 60 is a request for accessing the main storage 30, the bus input/output control section 5000 snoops it according to the mode specified by the signal on the transfer mode control signal line (CTL) 5003 and issues a transfer request to the transfer bus control section 5002 over the transfer request signal line (TSREQ) 5005. To enable such snooping, an address of the main storage 30, etc., for determining that the transaction is intended for the main storage 30 may be previously stored and able to be grasped.

If the transfer bus control section 5002 acknowledges the transfer request, it returns a signal indicating that the request is acknowledged to the bus input/output control section 5000 over the transfer request acknowledge signal line (TSACK) 5006.

When data is transferred from the system 11, the transfer bus control section 5002 sends a signal indicating the event to the bus input/output control section 5000 on the bus send request signal line (BSREQ) 5008. Then, the bus input/output control section 5000 issues a bus use request to the bus arbiter 3000 over the bus request signal line (BREQ) 600. When the bus input/output control section 5000 is informed that bus use is granted by a signal returned via the bus grant signal line (BGRT) 601 from the bus arbiter 3000, it outputs data onto the system bus 60. Upon acknowledgement of the request, the bus input/output control section 5000 sends a predetermined signal indicating that the request is acknowledged to the transfer bus control section 5002 on the bus send request acknowledge signal line (BSACK) 5007.

The transfer mode control section 5001 stores data indicating the transfer mode in the TMODE 5020 and outputs a signal indicating the transfer mode contents to the bus input/output control section 5000 on the CTL 5003.

The address comparator 5030 compares 25 bit and 26 bit of the address register SAR 5011 with AD0 bit and AD1 bit of the TMODE register (details will be given below), and sends the comparison result to the bus input/output 5000 via the signal line 5031. The transfer mode will be discussed below.

The transfer bus control section 5002 and the transfer mode control section 5001 are connected by a transfer send error signal line (TSERR) 5009. If an error occurs when data is transferred to the system 11, information indicating the error occurrence is stored in the TSTAT 5021 via the TSERR 5009.

A transfer request signal line (TREQ) 7000, a mate system busy signal line (DBSY) 7001, a home system busy signal line (TBSY) 7002, a transfer address valid signal line (TAVLD) 7003, a transfer data valid signal line (TDVLD) 7004, and a transfer error signal line (TERR) 7005, which make up the transfer channel 700, are connected to the transfer bus control section 5002.

The mate system busy signal line (DBSY) 7001 is connected to a "home system busy signal line" in the mate system (in this case, the system 11) not shown and the home system busy signal line (TBSY) 7002 is connected to a "mate system busy signal line" in the mate system (in this case, the system 11) not shown.

The transfer bus control section 5002 outputs a transfer request signal onto the TREQ 7000 in response to a request from the bus input/output control section 5000. If a busy signal is not output to the DBSY 7001, data is transferred over the TAVLD 7003 and the TDVLD 7004. While data is being transferred to the system 11 (specifically, DT 510 in FIG. 1), if the transfer bus control section 5002 receives an error occurrence report on the TERR 7005 from the system 11, it informs the transfer mode control section 5001 that an error has occurred via the TSERR 5009.

By the way, information indicated by the signal on the address/data signal line (ADDT) 605 which forms a part of the system bus 60 is held in the RCVR 5010 under the control of the bus input/output control section 5000. After this, the information held in the RCVR 5010 is held in any register of the SAR 5011, the SDR 5012, and the TMODE 5020 according to the type of transaction.

The address held in the SAR 5011 is set in the TSNDR 5013 and sent to the data transfer unit (DT 510) in the system 11 (not shown) via a transfer address/data signal line (TADDT) 7006, which forms a part of the transfer channel 700, under the control of the transfer bus control section 5002.

If a transfer request is transmitted on the TREQ 7000 from the system 11, the transfer bus control section 5002 acknowledges transfer data and sends a signal to the bus input/output control section 5000 over the BSREQ 5008. If transfer cannot be acknowledged, the transfer bus control section 5002 returns a signal indicating that transfer cannot be acknowledged to the system 11 via the TBSY 7002.

The data sent from the system 11 is temporarily held in the TRCVR 5014 and then in the RAR 5015 or RDR 5016 under the control of the transfer bus control section 5002.

The data temporarily held in the TRCVR 5014 is subjected to a parity check by the parity check circuit (PC) 5018. If an error is detected, the parity check circuit (PC) 5018 outputs a signal indicating parity error occurrence to the transfer bus control section 5002 on a parity error signal line (PTERR) 5022. Then, the transfer bus control section 5002 informs the DT transferring the data of the parity error occurrence over the TERR 7005.

Next, the data held in the RAR 5015 and the RDR 5016 is temporarily held in the SNDR 5017 and sent onto the ADDT 605 under the control of the bus input/output control section 5000. The contents held in the TSTAT 5021 are also temporarily held in the SNDR 5017, then sent onto the ADDT 605.

In the embodiment, which of the DTs is to be used for data transfer is determined by the copy source memory address.

For example, assume that data is copied in 32-byte units and that the four units DT 500 to DT 503 are connected to the system 10.

Figure 7:
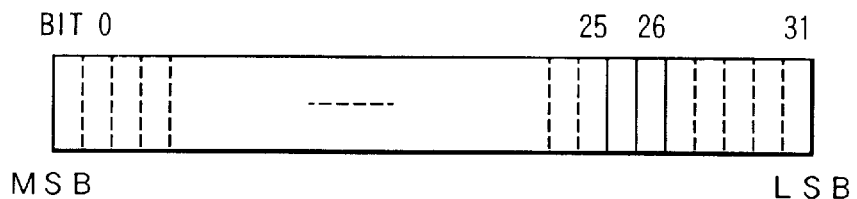
FIG. 7 is an illustration of an address representation method.

FIG. 7 shows an example of an address representation method. The embodiment uses byte addressing and represents an address by 32 bits. The MSB (most significant bit) is bit 0 and the LSB (least significant bit) is bit 31. Since 32-byte transfer units are distinguished from each other by the low-order five bits ($2^5$=32), the DT may be assigned according to the value of bits 25 and 26, the seventh and sixth least significant bits of an address.

Figure 8:
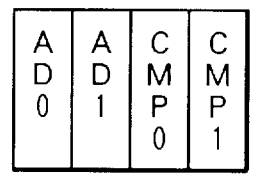
FIG. 8 is an illustration of the contents set in a transfer mode register.

FIG. 8 shows an example of the contents set in the transfer mode register (TMODE) 5020 in the DT 500.

To use a plurality of DTs, the DT is determined by the value set in the two bits AD0 and AD1. The transfer mode is determined by the value set in the two bits CMP0 and CMP1. 2-bit data representing each DT is previously defined for the four DTs. For example, to identify the four DTs, 2-bit data "00," "01," "10," and "11" may be respectively assigned to DT 500, DT 501, DT 502, and DT 503.

The meanings of each transfer mode determined by the 2-bit data of CMP0 and CMP1 are as shown in FIG. 8.

In the embodiment, to use four DTs, the bit string AD0, AD1, CMP0, CMP1 is set to "0011" for the DT 500, "0111" for the DT 501, "1011" for the DT 502, and "1111" for the DT 503.

Thus, if bits 25 and 26 of address data are "00," the DT 500 takes charge of copy; if "01," the DT 501 takes charge of copy; if "10," the DT 502 takes charge of copy; if "11," the DT 503 takes charge of copy, whereby the DTs can share the copying load.

When such the copy mode is set (for example, if CMP0 and CMP1 are "11"), each DT snoops every memory access on the system bus 60. If one of the DTs determines that it takes charge of data, the DT transfers access data to the system 11.

Figure 9:
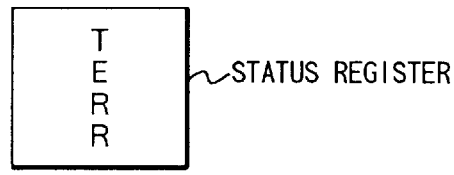
FIG. 9 is an illustration of the contents set in a transfer status register.

FIG. 9 shows a TERR bit indicating whether or not an error occurs, contained in the status register (TSTAT) 5021 in the DT 500. If a data transfer error occurs when a memory copy is made, the TERR bit is set to "1."

Figure 22:
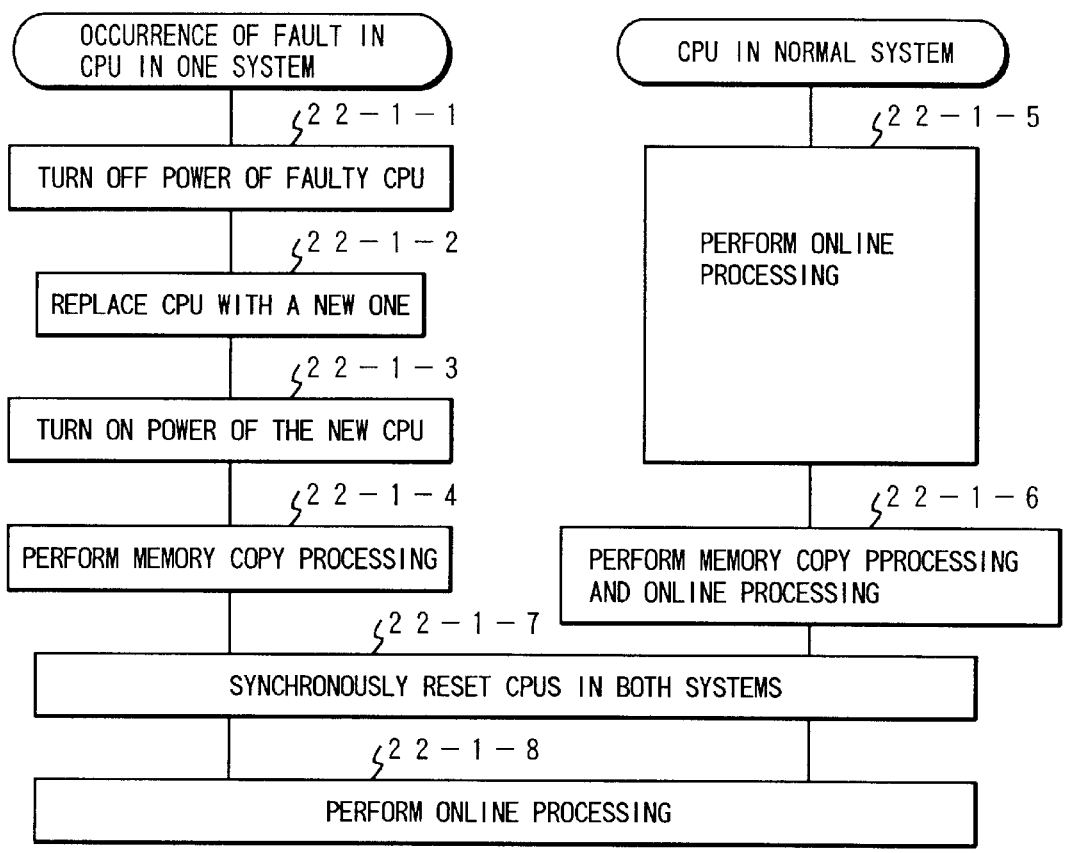
FIG. 22 is a flowchart for illustrating a CPU replacement process in the dual computer system.

Processing performed when a fault occurs in the CPU in one system will be outlined with reference to FIG. 22.

First, when a fault occurs in the CPU in one system, the power of the faulty CPU is turned off at step 22-1-1, and next the CPU is replaced with a new CPU at step 22-1-2 and the power of the new CPU is turned on at step 22-1-3 for placing the system in an operable state. On the other hand, the CPU normally operating in the other system continues online processing at step 22-1-5, and performs memory copy processing and online processing at step 22-1-6. This means that the memory contents of the CPU in the normal system are copied into the memory of the new CPU (that is, the memory in the system having the replaced CPU). The memory copy processing at step 22-1-6 is memory transmission processing and that at step 22-1-4 is memory reception processing. When the memory copy processing is thus performed and completed, the CPUs in both systems are synchronously reset at step 22-1-7, namely, they are started at the same time, so that they can start online processing in synchronization at step 22-1-8. The embodiment relates to the memory copy processing.

Figure 10:
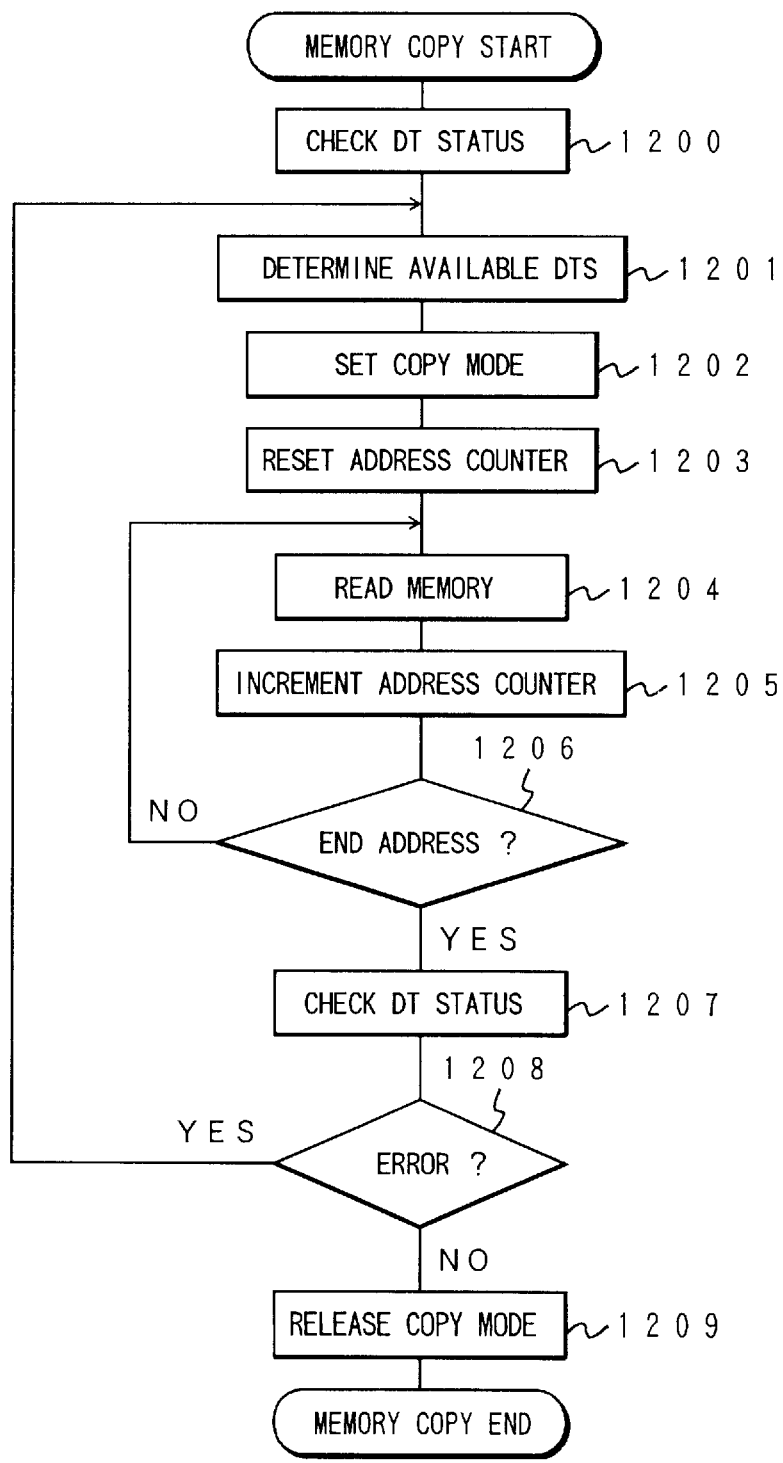
FIG. 10 is a flowchart showing a memory copy process.

FIG. 10 is a flowchart showing a memory copy sequence in the embodiment.

In the embodiment, for example, CPU software is executed for making a memory copy. FIG. 10 represents a memory copy program flowchart. The memory copy program is executed as background processing (which is executed behind and separately from the main program) rather than being executed in a condition in which the program is built into a main program in the normal system, such as an on line transaction processing program. The time required for a memory copy depends on how the copy program processing time is assigned to the CPU.

First, each DT is checked for status at the beginning of a memory copy at step 1200. If an error is detected in one DT at that time, the DT is not used.

Next, available DTs are determined at step 1201 and the transfer mode is set in the transfer mode register of each DT at step 1202. In the specification, a mode which executes a memory copy among the transfer mode called a "copy mode".

Next, the address counter is reset to copy all the memory contents at step 1203 and data is read from the memory in accordance with the address indicated by the counter at step 1204.

The address counter can be provided by a CPU register, for example. That is, the register is reset in the initial state.

The copy process is executed by using the value indicated by the register contents as the address value. Read data is not used for any other processing. Thus, the DTs can snoop data flowing on the system bus 60 and can transfer data to the system 11. That is, each DT determines whether or not it should take charge of transfer of the data based on the address, and transfers only the corresponding data. Of course, the DT in charge may be predetermined in 32-bit units according to the address as described above.

The address counter (CPU register) is incremented at step 1205. When the end address of the memory is reached at step 1206, the DT is checked for status at step 1207.

If no error is found at step 1208, the copy mode is released at step 1209 and the memory copy ends.

If a transfer error is found, control returns to step 1201 and the process is again started from the DT determination at step 1201. Thus, even if a DT fault occurs when a memory copy is made, any remaining available DT can be used to again make a memory copy.

Figure 23:
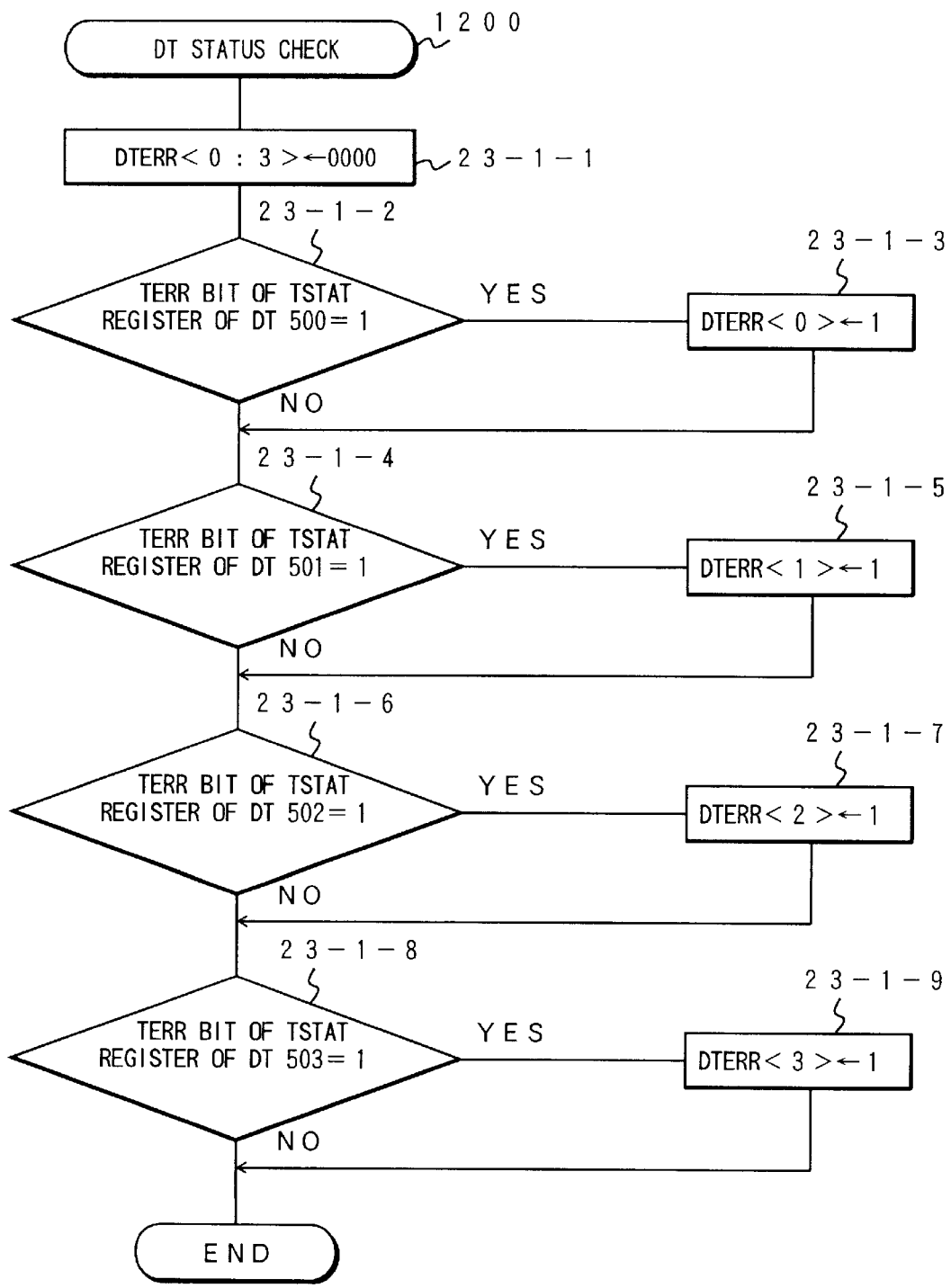
FIG. 23 is a flowchart of DT status check during memory copy processing.

Next, a detailed process flow of DT status check (1200) will be discussed with reference to FIG. 23. The normal CPU reserves an array DTERR <0:3>, which consists of array elements 0 to 3 for storing four bits, and checks the TERR bit of the TSTAT register of each DT for determining available DT.

First, to initialize DTERR <0:3>, the bits are set to 0 at step 23-1-1. Next, whether or not the TERR bit of the TSTAT register of DT 500 is 1 is determined at step 23-1-2. If the bit is 1, control goes to step 23-1-3 at which DTERR <0> is set to 1, meaning that the DT 500 is not available.

If the bit is not 1 at step 23-1-2, control goes to step 23-1-4 at which whether or not the TERR bit of the TSTAT register of DT 501 is 1 is determined. If the bit is 1, control goes to step 23-1-5; if the bit is not 1, control goes to step 23-1-6. At step 23-1-5, DTERR <1> is set to 1. At step 23-1-6, whether or not the TERR bit of the TSTAT register of DT 502 is 1 is determined. If the bit is 1, control goes to step 23-1-7; if the bit is not 1, control goes to step 23-1-8. At step 23-1-7, DTERR <2> is set to 1. At step 23-1-8, whether or not the TERR bit of the TSTAT register of DT 503 is 1 is determined. If the bit is 1, control goes to step 23-1-9 at which DTERR <3> is set to 1; if the bit is not 1, the process is terminated.

Now, the array DTERR <0:3> stores information by which whether or not DT 500, DT 501, DT 502, and DT 503 are available can be determined.

Next, a detailed process flow of "determine available DTs"(1201) in FIG. 10 will be discussed with reference to a flowchart of FIG. 24. This flowchart indicates how the TMODE registers of the DTs are set. First, at step 24-2-1, the TMODE registers are set by assuming that all DTs are normal. That is, AD0, AD1, CMP0, and CMP1 of the TMODE register of the DT 500 are set to 0, 0, 1, and 1 respectively. Likewise, the TMODE registers of other DTs are set as shown in the figure although they are set to different values. As a result of the setting, each DT will receive data according to the value of bits 25, 26 of each address and execute a memory copy into the CPU in the mate system for enabling a high-speed memory copy using the four DTs.

Next, at step 24-2-2, whether or not DTERR <0:3> is "1000" is determined for determining whether or not the DT 500 is available.

If DTERR <0:3> is "1000," control goes to step 24-2-3 at which CMP0 and CMP1 of the TMODE register of the DT 500 are both set to 0. As a result, the DT 500 is set so as not to execute a memory copy as seen in FIG. 8. To set other DTs (501, 502, and 503) so that they execute a memory copy, at step 24-2-4, the CMP0 and CMP1 bits of the TMODE register of the DT 501 are set to 1 and 0 respectively. As a result, the DT 502 executes a memory copy if bit 26 of each address matches AD1 (set to 0). That is, the DT 502 executes a memory copy into the addresses for which the DT 500 is responsible.

Likewise, at steps 24-2-5, 24-2-8, and 24-2-11, whether or not the DT 501, DT 502, and DT 503 are unavailable is determined. If any of them is unavailable, the TMODE registers are set so that the other three DTs are used to execute a memory copy. Step 24-2-14 is executed to make a memory copy even if more than one DT is unavailable.

Figure 24:
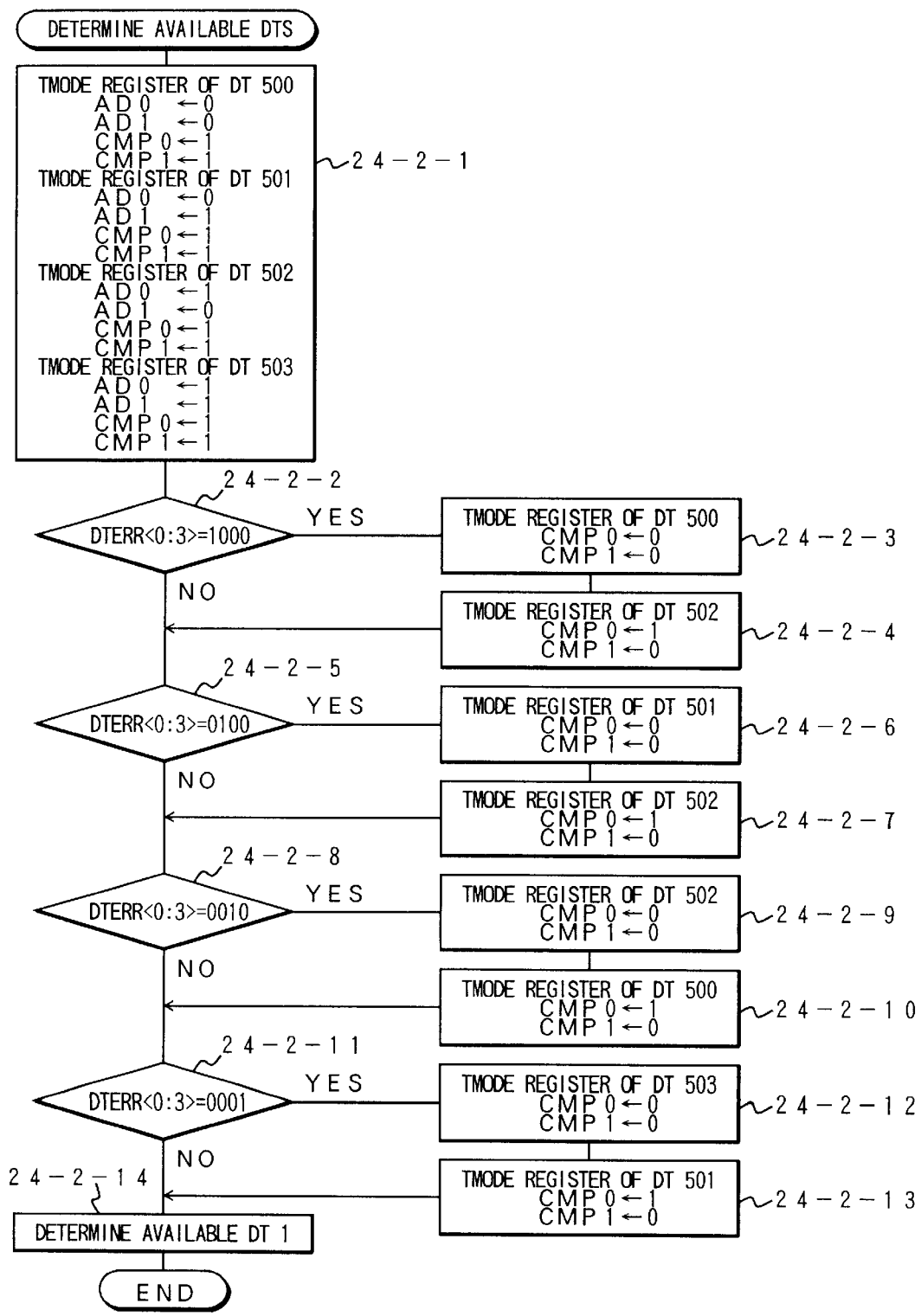
FIG. 24 is a flowchart of determining available DTs during memory copy processing.
Figure 25:
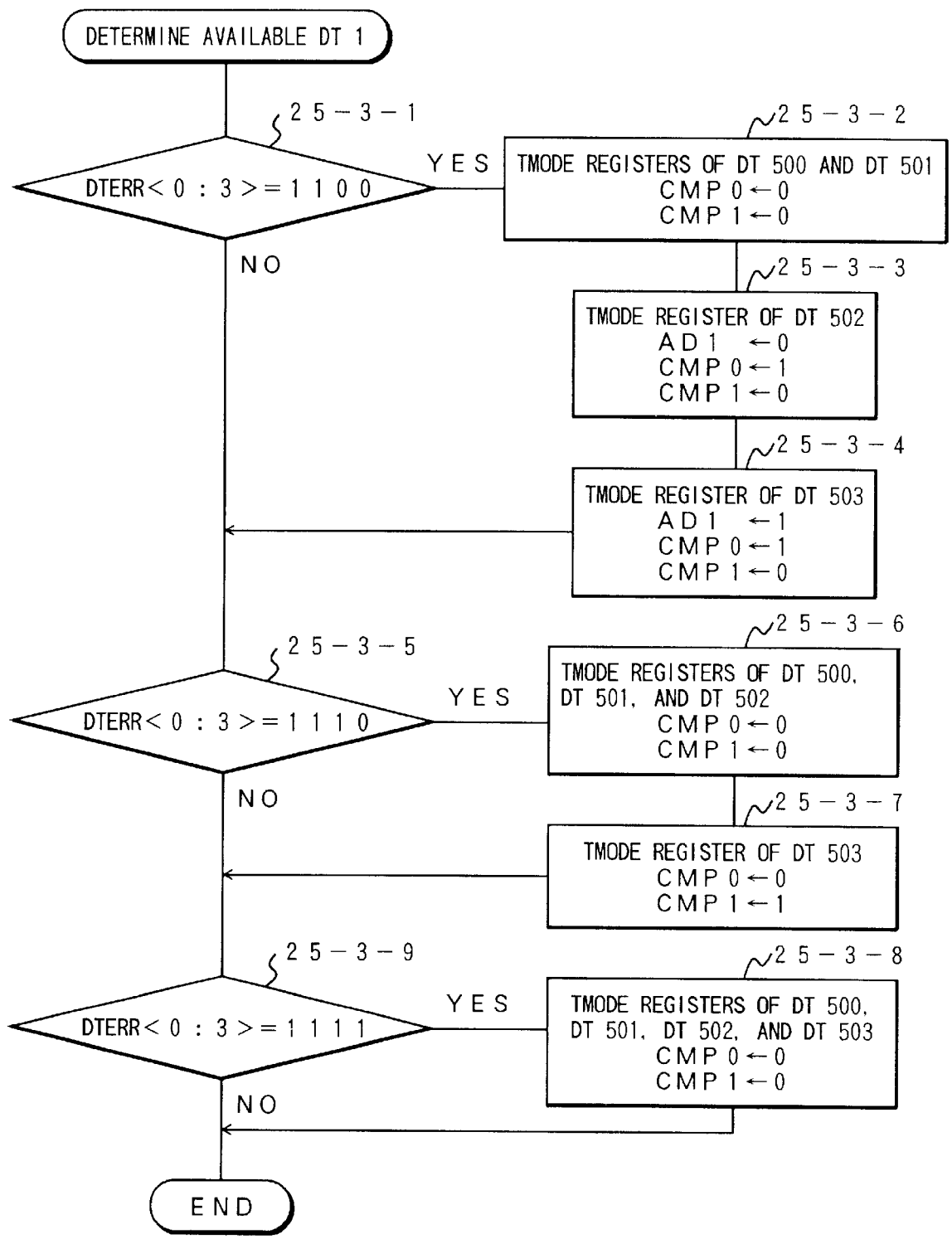
FIG. 25 is a flowchart of determining available DTs 1 during memory copy processing.

FIG. 25 is a detailed process flow of step 24-2-14 in FIG. 24.

First, at step 25-3-1, whether or not DTERR <0:3> is "1100" is determined. That is, if the DT 500 and DT 501 are unavailable and the DT 502 and DT 503 are available, steps 25-3-2, 25-3-3, and 25-3-4 are executed for setting the TMODE registers. At step 25-3-2, CMP0 and CMP1 of the TMODE registers of the DT500 and DT 501 are set to 0 so that they do not execute a memory copy. Next, at step 25-3-3, to make the DT 502 share the load of executing a memory copy which should be executed by the DT 500, AD1, CMP0, and CMP1 are set to 0, 1, and 0 respectively. Likewise, at step 25-3-4, to make the DT 503 share the load of executing a memory copy which should be executed by the DT 501, AD1, CMP0, and CMP1 are set to 1, 1, and 0 respectively. Thus, even if two DTs are unavailable, the other two DTs can be used to execute a memory copy. Of course, if a fault occurs in another combination of DTs, a memory copy can be made by the remaining DTs.

Next, at step 25-3-5, whether or not DTERR <0:3> is "1110" is determined. If DTERR <0:3> is "1110," three DTs fail. That is, if the DT 500, DT 501, and DT 502 are unavailable, steps 25-3-6 and 25-3-7 are executed for setting the TMODE registers.

At step 25-3-6, CMP0 and CMP1 of the TMODE registers of the DT 500, DT 501, and DT 502 are set to 0 so that they do not execute a memory copy. Next, at step 25-3-7, CMP0 and CMP1 of the TMODE register of the DT 503 are set to 0 and 1 respectively so that only the DT 503 executes a memory copy.

Step 25-3-8 is executed if all DTs are unavailable. This step is executed when the all DTs are determined to be unavailable at step 25-3-9.

In this case, CMP0 and CMP1 of the TMODE registers of all DTs are set to 0. Of course, if similar processing is performed, a memory copy is enabled although combinations of DTs other than the combination of DT 501 and DT501 are unavailable.

Setting the TMODE registers of the DTs is now complete.

Figure 11:
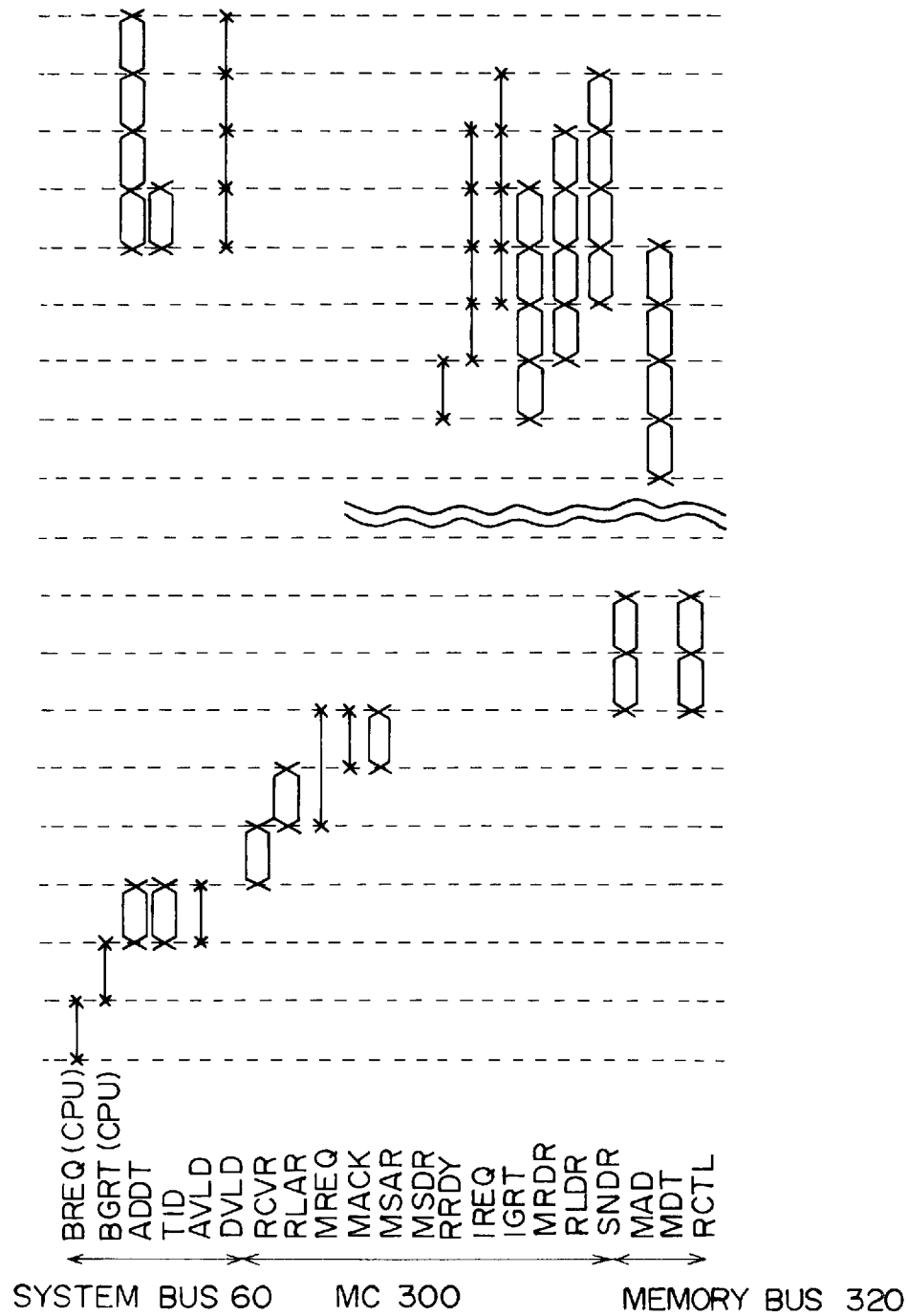
FIG. 11 is a memory read timing chart.

FIG. 11 is a memory read timing chart for the CPU 20 in the MC 300. In FIGS. 11 to 14, each horizontal solid line denotes that 1-bit data exists on the signal line and each polygon denotes that data of two or more bits exists on the signal line.

The timing chart shows how the signals are output to the signal lines with a lapse of time while the MC 300 receives a request signal output onto the system bus 60, outputs an address to the memory bus 320, receives data at the address from the memory bus 320, and outputs the data onto the system bus 60. The symbols of the signals correspond to those representing the signals in FIG. 5.

Figure 12:
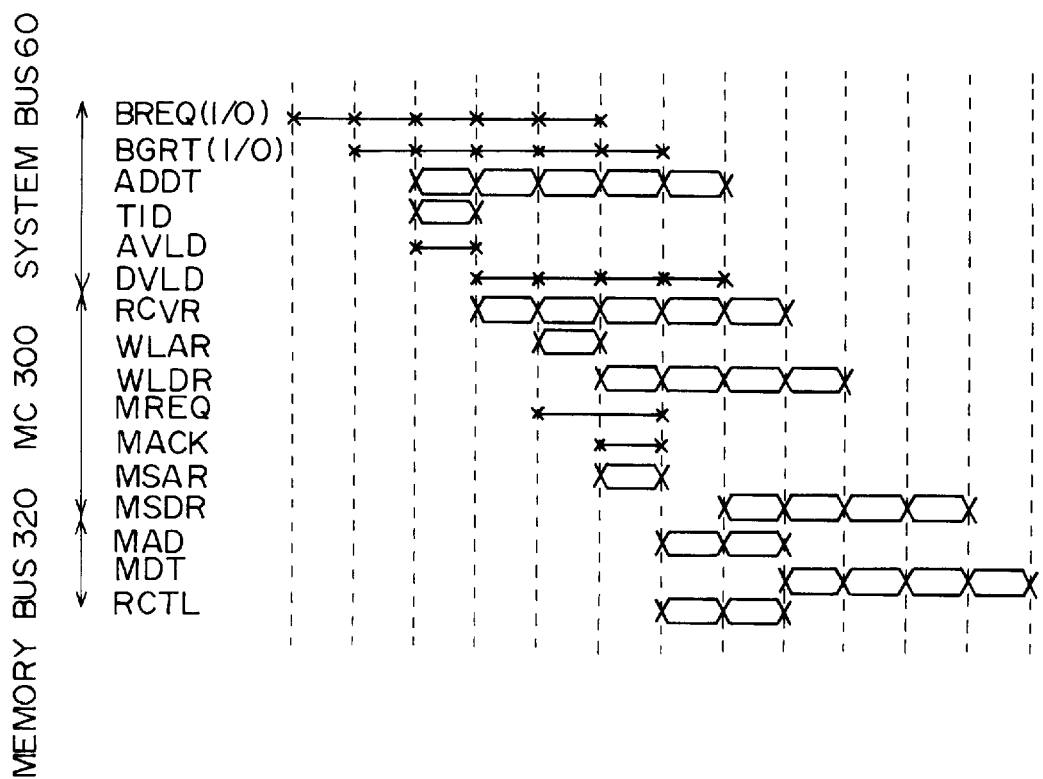
FIG. 12 is a DMA write timing chart.

FIG. 12 is a DMA write timing chart from the I/O 40 in the MC 300. The timing chart shows how the signals are output to the signal lines with a lapse of time while the MC 300 receives a request signal and data output onto the system bus 60 and outputs address and the data onto the system bus 60. The symbols of the signals correspond to those representing the signals in FIG. 5.

Figure 13:
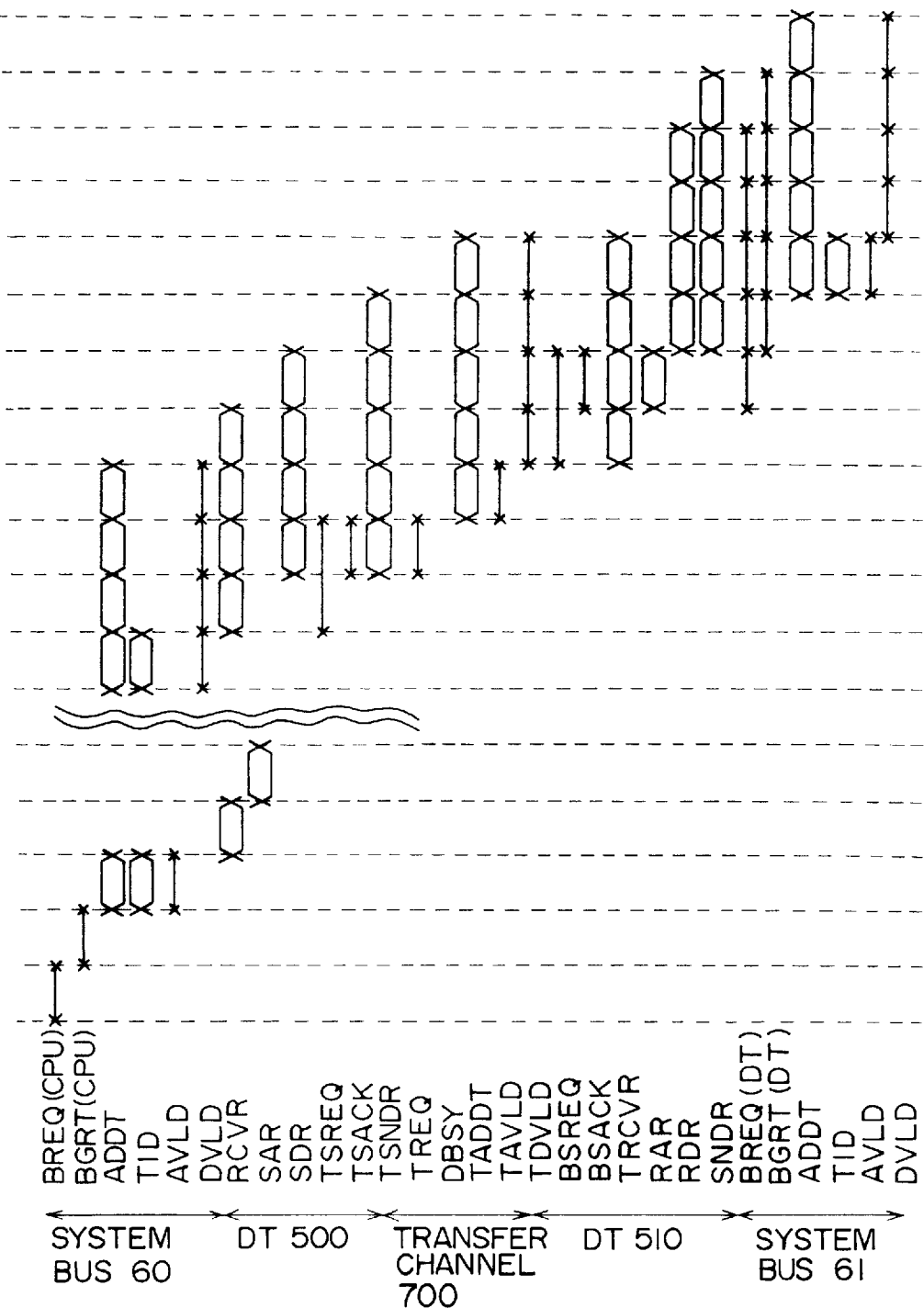
FIG. 13 is a timing chart when the read memory contents are transferred to the mate system.

FIG. 13 is a timing chart when the DT 500 snoops memory read by the CPU 20. The timing chart shows how the signals are output to the signal lines with a lapse of time while the DT 500 reads a request signal output onto the system bus 60 and data read from the memory, then outputs the data onto the transfer channel 700 and the DT 510 in the system 11 receives the output data, then outputs the received data onto the system bus 61 in the system 11. The same request signal as DMA write is output to the system bus 61 in the system 11 and the MC 310 in the system 11 receives the signal and writes the data into the memory, the timing of which becomes the same as in FIG. 12. The symbols of the signals correspond to those representing the signals in FIGS. 5 and 6.

Figure 14:
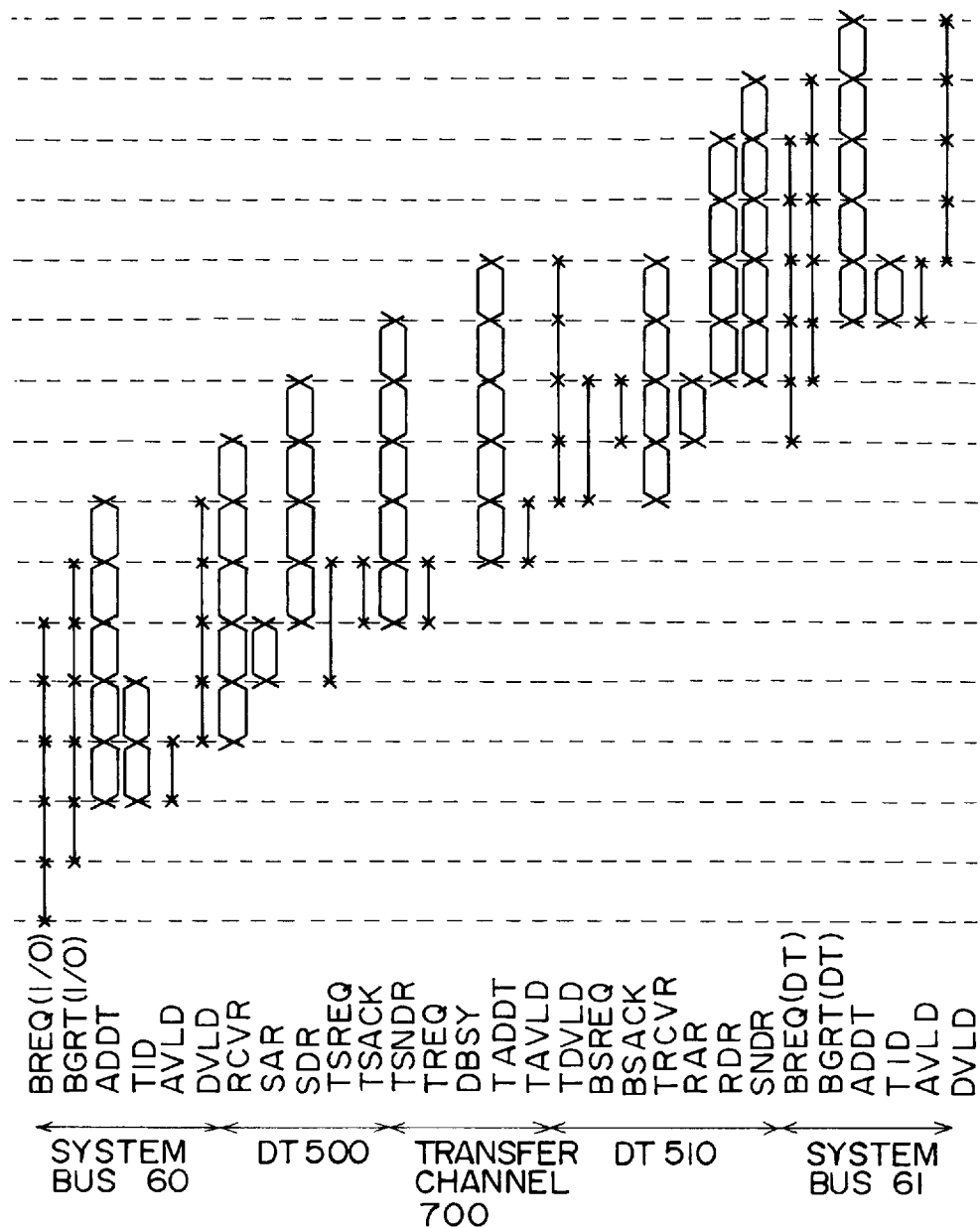
FIG. 14 is a timing chart when data written by DMA is transferred to the mate system.

FIG. 14 is a timing chart when the DT 500 snoops DMA write from the I/O 40. The timing chart shows how the signals are output to the signal lines with a lapse of time while the DT 500 reads a request signal and data output onto the system bus 60, then outputs the data onto the transfer channel 700 and the DT 510 in the system 11 receives the output data, then outputs the data onto the system bus 61 in the system 11. The symbols of the signals correspond to those representing the signals in FIGS. 5 and 6.

Next, a second embodiment of the invention will be discussed mainly with reference to FIGS. 15, 19A, and 20.

FIG. 15 is a block diagram showing a configuration example of a dual computer system according to the second embodiment of the invention. The dual computer system differs from that of the first embodiment in that a central processing unit (CPU) 20 is connected to a main storage (MS) 330 by a CPU bus 80.

Figure 19A:
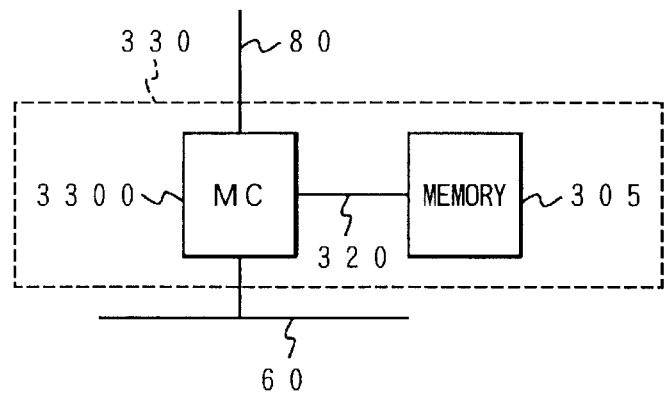
FIGS. 19A to 19C are block diagrams of main storages according to the modified forms of the second embodiment of the invention.

FIG. 19A is a block diagram showing the internal configuration of the main storage (MS) 330.

The MS 330 is the same as the MS 30 of the first embodiment except that the CPU bus 80 is connected to a memory controller (MC) 3300. The MC 3300 and a memory 305 are connected by a memory bus 320 and further the MC 3300 is connected to a system bus 60.

Figure 20:
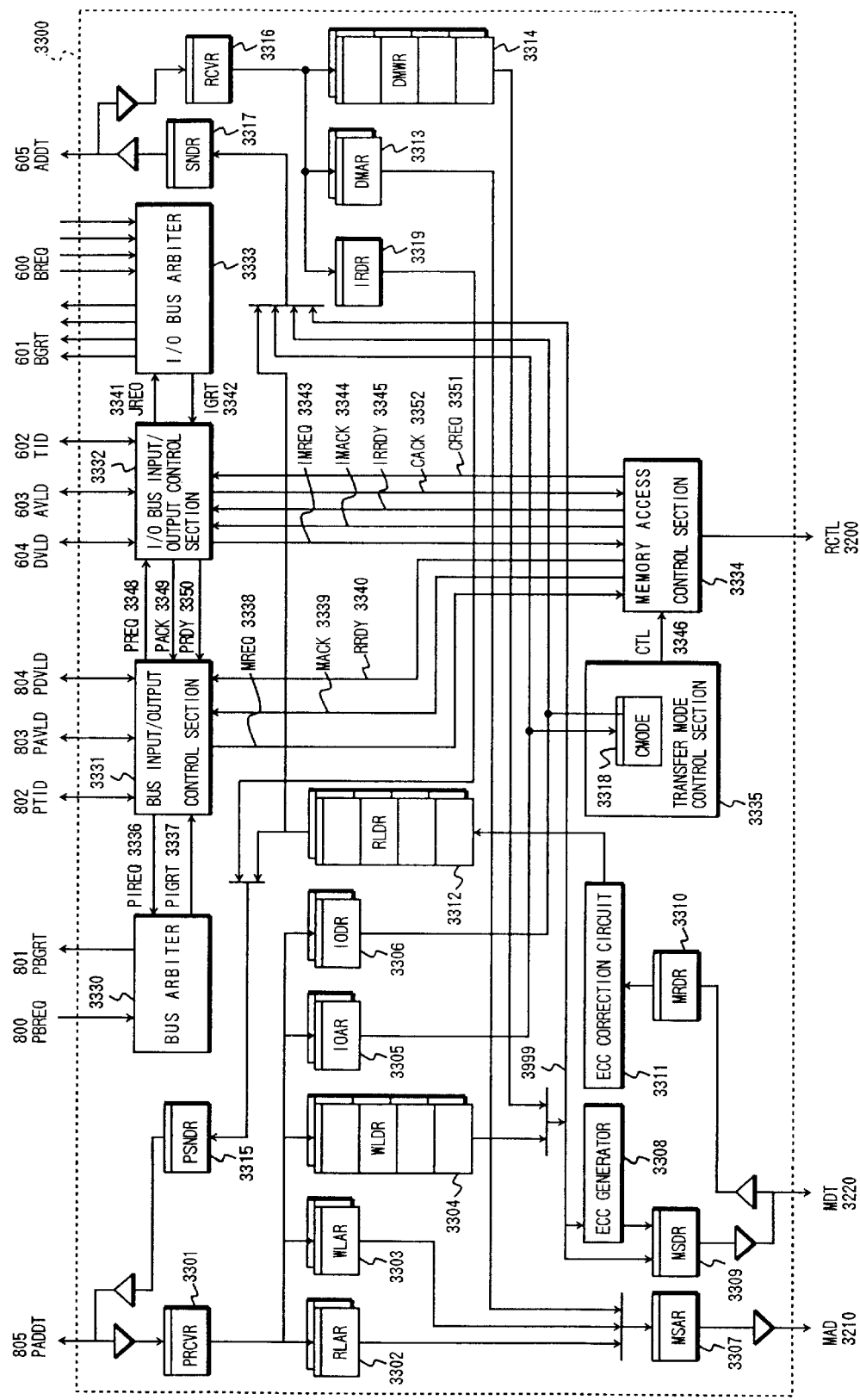
FIG. 20 is a block diagram of a memory controller according to the second embodiment of the invention.

FIG. 20 is a block diagram showing a configuration example of the MC 3300.

The MC 3300 comprises a bus arbiter 3330, a bus input/output control section 3331, an I/O bus input/output control section 3332, an I/O bus arbiter 3333, a memory access control section 3334, a transfer mode control section 3335, a receive register (PRCVR) 3301, a read line address register (RLAR) 3302, a write line address register (WLAR) 3303, a write line data register (WLDR) 3304, a PIO address register (IOAR) 3305, a PIO data register (IODR) 3306, a memory send address register (MSAR) 3307, an ECC (error correction code) generator 3308, a memory send data register (MSDR) 3309, a memory read data register (MRDR) 3310, an ECC correction circuit 3311, a read line data register (RLDR) 3312, a DMA address register (DMAR) 3313, a DMA write data register (DMWR) 3314, a send register (PSNDR) 3315, a receive register (RCVR) 3316, a send register (SNDR) 3317, a transfer mode setting register (CMODE) 3318, and a PIO read data register (IRDR) 3319.

The components can be provided by electronic devices, such as CMOS logic circuits and RAM devices. Signal lines having the same functions as those previously described with reference to FIGS. 5 and 6 are denoted by the same symbols in FIG. 20.

The bus arbiter 3330 is connected to the CPU 20 by a bus request signal line (PBREQ) 800 and a bus grant signal line (PBGRT) 801, which form a part of the CPU bus 80. The bus arbiter 3330 and the bus input/output control section 3331 are connected by an internal bus request signal line (PIREQ) 3336 and an internal bus grant signal line (PIGRT) 3337.

The bus arbiter 3330 arbitrates bus requests output from the CPU 20 and the memory controller 3300, determines the unit to which bus use is granted, and sends a signal granting the bus use to the determined unit over the bus grant signal line (PBGRT) 801.

Bus request signal lines (BREQ) 600 and bus grant signal lines (BGRT) 601, which form a part of the system bus 60, are connected to the I/O bus arbiter 3333. The bus request signal lines and bus grant signal lines are connected to the units connected to the system bus 60, respectively.

The I/O bus arbiter 3333 and the I/O bus input/output control section 3332 are connected by an internal bus request signal line (IREQ) 3341 and an internal bus grant signal line (IGRT) 3342.

The I/O bus arbiter 3333 arbitrates bus requests output from the units also containing the memory controller 3300, determines the unit to which bus use is granted, and sends a signal granting the bus use to the determined unit over the bus grant signal line (BGRT) 601.

A transaction ID signal line (PTID) 802, an address valid signal line (PAVLD) 803, and a data valid signal line (PDVLD) 804, which form a part of the CPU bus 80, are connected to the bus input/output control section 3331. The bus input/output control section 3331 and the memory access control section 3334 are connected by a memory access request signal line (MREQ) 3338, a request acknowledge signal line (MACK) 3339, and a read data ready signal line (RRDY) 3340.

The bus input/output control section 3331 and the I/O bus input/output control section 3332 are connected by a PIO access request signal line (PREQ) 3348, a request acknowledge signal line (PACK) 3349, and a read data ready signal line (PRDY) 3350.

When the CPU 20 outputs a transaction onto the CPU bus 80 and if the transaction is a request for accessing the memory, the bus input/output control section 3331 sends a memory access request signal to the memory access control section 3334 over the MREQ 3338.

When acknowledging the request, the memory access control section 3334 returns a signal indicating that the request is acknowledged to the bus input/output control section 3331 over the MACK 3339.

When data is read from the memory, the bus input/output control section 3331 is informed that the data has been read from the memory by the signal sent on the RRDY 3340. Then, the bus input/output control section 3331 outputs a signal onto the PIREQ 3336 for issuing a request for bus use to the bus arbiter 3330. When the bus input/output control section 3331 is informed that bus use is granted by a signal returned from the bus arbiter 3330 over the PIGRT 3337, it outputs the data onto the CPU bus 80.

If the transaction is a request for accessing I/O, the bus input/output control section 3331 sends an I/O access request signal to the I/O bus input/output control section 3332 over the PREQ 3348.

When acknowledging the request, the I/O bus input/output control section 3332 returns a signal indicating that the request is acknowledged to the bus input/output control section 3331 over the PACK 3349.

When data is read from the I/O, the bus input/output control section 3331 is informed that the data has been read from the I/O by the signal sent on the RRDY 3350. Then, the bus input/output control section 3331 outputs a signal onto the PIREQ 3336 for issuing a request for bus use to the bus arbiter 3330. When the bus input/output control section 3331 is informed that bus use is granted by a signal returned from the bus arbiter 3330 over the PIGRT 3337, it outputs the data onto the CPU bus 80. If the transaction is a mode setting request for the MC 3300, the register contents are read from the PIO address register IOAR 3305 and set in the transfer mode setting register CMODE 3318 contained in the transfer mode control section 3335.

A transaction ID signal line (TID) 602, an address valid signal line (AVLD) 603, and a data valid signal line (DVLD) 604, which form a part of the system bus 60, are connected to the I/O bus input/output control section 3332.

The I/O bus input/output control section 3332 and the memory access control section 3334 are connected by a memory access request signal line (IMREQ) 3343, a request acknowledge signal line (IMACK) 3344, a read data ready signal line (IRRDY) 3345, a memory copy request signal line (CREQ) 3351, and a request acknowledge signal line (CACK) 3352.

The I/O bus input/output control section 3332 monitors the transaction output onto the system bus 60. If the transaction is a request issued to the I/O bus input/output control section 3332, the control section 3332 reads it and sends a request signal to the memory access control section 3334 over the IMREQ 3343. When acknowledging the request, the memory access control section 3334 returns a signal indicating that the request is acknowledged to the I/O bus input/output control section 3332 over the IMACK 3344.

When data is read from the memory, the I/O bus input/output control section 3332 is informed that the data has been read from the memory by the signal sent over the IRRDY 3345. Then, the I/O bus input/output control section 3332 outputs a signal onto the IREQ 3341 for issuing a request for bus use to the I/O bus arbiter 3333. When the I/O bus input/output control section 3332 is informed that bus use is granted by a signal returned from the I/O bus arbiter 3333 over the IGRT 3342, it outputs the data onto the system bus 60.

As described above, the memory copy request signal line (CREQ) 3351 and the request acknowledge signal line (CACK) 3352 are also connected between the I/O bus input/output control section 3332 and the memory access control section 3334.

When the memory copy mode is set, if a memory access is made, the memory access control section 3334 outputs a request signal to the I/O bus input/output control section 3332 on the CREQ 3351. If the I/O bus input/output control section 3332 acknowledges the request, it returns a signal indicating that the request is acknowledged to the memory access control section 3334 on the CACK 3352. The I/O bus input/output control section 3332 sends data to the data transfer unit (DT) connected to the system bus 60 by issuing a copy transaction.

A DRAM control signal line (RCTL) 3200, which forms a part of the memory system bus 320, is connected to the memory access control section 3334. The RCTL 3200 comprises address strobe and bank select signal lines, etc. The memory access control section 3334 is responsive to a request from the bus input/output control section 3331 for controlling an access to the memory 305 over the RCTL 3200 for performing data input/output processing in the memory.

The transfer mode control section 3335 stores a setup transfer mode in the CMODE 3318 and sends the transfer mode contents to the memory access control section 3334 over the CTL 3346. The transfer mode will be discussed below.

Information on an address/data signal line (PADDT) 805, which forms a part of the CPU bus 80, is held in the PRCVR 3301 under the control of the bus input/output control section 3331. After this, the contents held in the PRCVR 3301 are held in any of the RLAR 3302, the WLAR 3303, the WLDR 3304, the IOAR 3305, and IODR 3306 according to the type of transaction.

Information on an address/data signal line (ADDT) 605, which forms a part of the system bus 60, is held in the RCVR 3316 under the control of the I/O bus input/output control section 3332. Considering that a request from the I/O is DMA, the contents held in the RCVR 3316 are held in the DMAR 3313 and the DMWR 3314.

PIO read data read from the I/O is temporarily held in the RCVR 3316, then in the IRDR 3319 and further temporarily held in the PSNDR 3315, then output onto the PADDT 805.

The addresses held in the RLAR 3302, the WLAR 3303, and the DMAR 3313 are set in the MSAR 3307 and sent to the memory 305 over a memory address signal line (MAD) 3210, which forms a part of the memory system bus 320, under the control of the memory access control section 3334.

The write data held in the WLDR 3304 and the DMWR 3314, to which an ECC generated by the ECC (error correction code) generator 3308 is added, is set in the MSDR 3309 and sent to the memory 305 over a memory data signal line (MDT) 3220, which forms a part of the memory system bus 320, under the control of the memory access control section 3334.

The data read from the memory 305 is temporarily held in the MRDR 3310 via the MDT 3220 under the control of the memory access control section 3334.

Then, the data is passed through the ECC correction circuit 3311 for ECC correction and is held in the RLDR 3312.

If the transaction is a request from the CPU20, the data held in the RLDR 3312 is set in the PSNDR 3315 and output onto the PADDT 805 under the control of the bus input/output control section 3331.

If the transaction is a request from the I/O, the data held in the RLDR 3312 is set in the SNDR 3317 and output onto the ADDT 605 under the control of the I/O bus input/output control section 3332.

If the transaction is a mode setting request, the contents held in the IODR 3306 are set in the CMODE 3318.

If the copy mode is set, to read data from the memory, memory read data stored in the RLDR 3312 is temporarily held in the SNDR 3317. Then, the held data is output onto the ADDT 605.

To write data into the memory, write data held in the WLDR 3304 and the DMWR 3314 is temporarily held in the SNDR 3317 over a signal line 3999. Then, the held data is output onto the ADDT 605.

Figure 21:
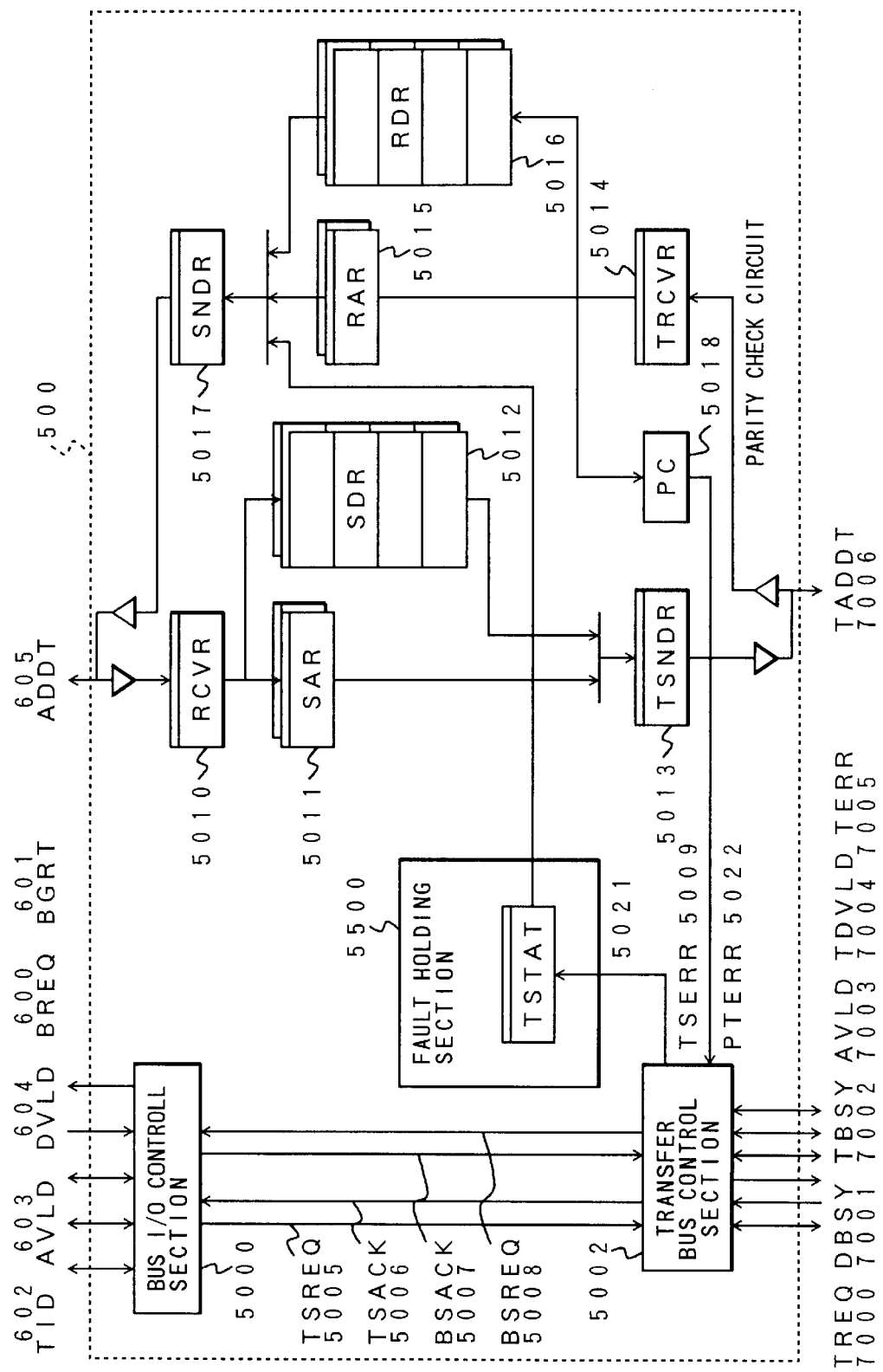
FIG. 21 is a block diagram of memory controller according to the second embodiment of the invention.

Next, the configuration of the DT 500 will be discussed with reference to FIG. 21.

It is basically the same as the configuration of the DT in FIG. 6 except that a fault holding section is added in place of the transfer mode control section (TMODE register and comparator) in FIG. 6. That is, the fault holding section 5500 has a TSTAT register indicating whether or not an error occurs at the time of memory copy.

FIGS. 2A to 2C show the contents set in the transfer mode register (CMODE) 3318.

FIG. 2A shows a 5-bit area in the register.

As shown in FIG. 2B, CPY is a bit for specifying whether or not a memory copy is to be made, and AVL0, AVL1, AVL2, and AVL3 are bits for indicating whether or not the transfer units DT 500, DT 501, DT 502, and DT 503 can be used, respectively.

FIG. 2C lists Tid of transaction issued for a memory copy, namely, the numbers of the transfer units DTs specified by the value of AVL0–AVL3 and the value of bits 25 and 26 of a memory address. "0" in the right box of FIG. 2C means that the DT 500 is started as the transfer unit for executing a memory copy; "1" means that the DT 501 is started; "2" means that the DT 502 is started; and "3" means that the DT 503 is started.

For example, when four transfer units DT can be used, assume that AVL0–AVL3 are "1111." A memory copy transaction is issued to the DT 500 if bits 25 and 26 of the address are "00," the DT 501 if the bits are "01," the DT 502 if the bits are "10," or the DT 503 if the bits are "11."

For example, when the two transfer units DT 500 and DT 501 can be used, assume that AVL0–AVL3 are "1100." A memory copy transaction is issued to the DT 500 if bit 26 of the address is "0" or the DT 501 if the bit is "1."

As described above, the second embodiment is similar to the first embodiment.

The memory copy processing is basically the same as that in FIG. 10. Although the TMODE registers are set in the processing previously described with reference to FIGS. 24 and 25, available DTs are determined from the table in FIG. 2C according to the value of AVL0, AVL1, AVL2, AVL3 and TiD is set when a transaction is issued to each DT. The values of AVL0, AVL1, AVL2, and AVL3 are those of TSTATs of DT 500, DT 501, DT 502, and DT 503 respectively.

The operation timings in the embodiment are basically the same as those in the first embodiment.

For a memory copy, such as memory read from the CPU 20, data read by the MC 3300 is transferred to the CPU 20 and a transaction in the same format as a DMA write is issued through the system bus 60 to the transfer unit DT.

The memory copy procedure is basically the same as that in the first embodiment shown in FIG. 10. The steps of checking the transfer unit status and determining the transfer unit DT are also required in the second embodiment, whereby even if fault or the like occurs in the transfer unit DT, another available DT can be used to continue the memory copy.

Although the transfer unit DT to be used is determined by the address of data to be accessed in the embodiment, different assignment of the DTs is enabled even if the configuration of the CMODE 3318 remains the same.

For example, the MC 3300 may contain a round-robin table for specifying available transfer units DTs in order.

The round-robin table is means for storing priorities of four transfer units DTs, for example. If the current DT being used exists, after the operation is complete, the DT is assigned the lowest priority and the priorities of the remaining DTs are raised. The new priorities are stored in the round-robin table. Then, if the priorities of the DTs are looked up in the round-robin table for selecting the DT having the highest priority, the DTs will be selected in order; a similar operation to that with the CMODE 3318 is performed.

In the first embodiment, DT 500 to DT 503 may each also contain a round-robin table performing the same operation and an available DT may snoop in order. In this case, however, means for informing each DT which DT is executing a copy needs to be provided, because track of the DT executing a copy needs to be kept by the means for updating the round-robin tables properly.

If each of the DT 500 to DT 503 in the second embodiment contains the same transfer mode register (TMODE) 5020 as the first embodiment and the MC 3300 contains the CPY bit only in the CMODE 3318 and outputs all copy data onto the system bus 60 during the copy mode, each DT can also transfer only the address specified in its transfer mode register.

Likewise, if DT 500 to DT 503 each contain a round-robin table performing the same operation and the MC 3300 contains the CPY bit only in the CMODE3318 and outputs all copy data onto the system bus 60 during the copy mode, the DTs can also execute a copy in order in accordance with the round-robin tables.

Figure 16:
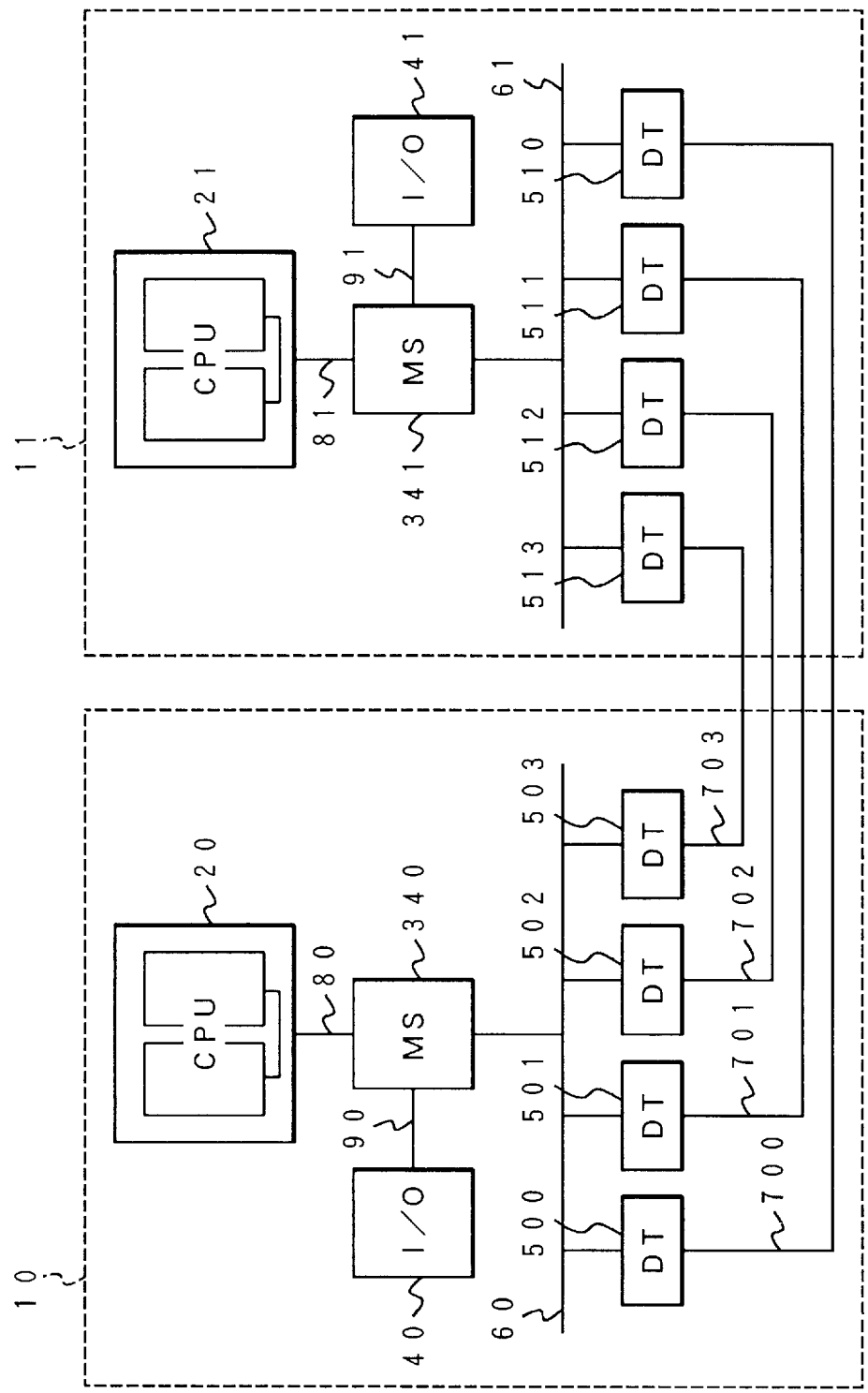
FIG. 16 is a block diagram of a dual computer system according to one modified form of the second embodiment of the invention.
Figure 17:
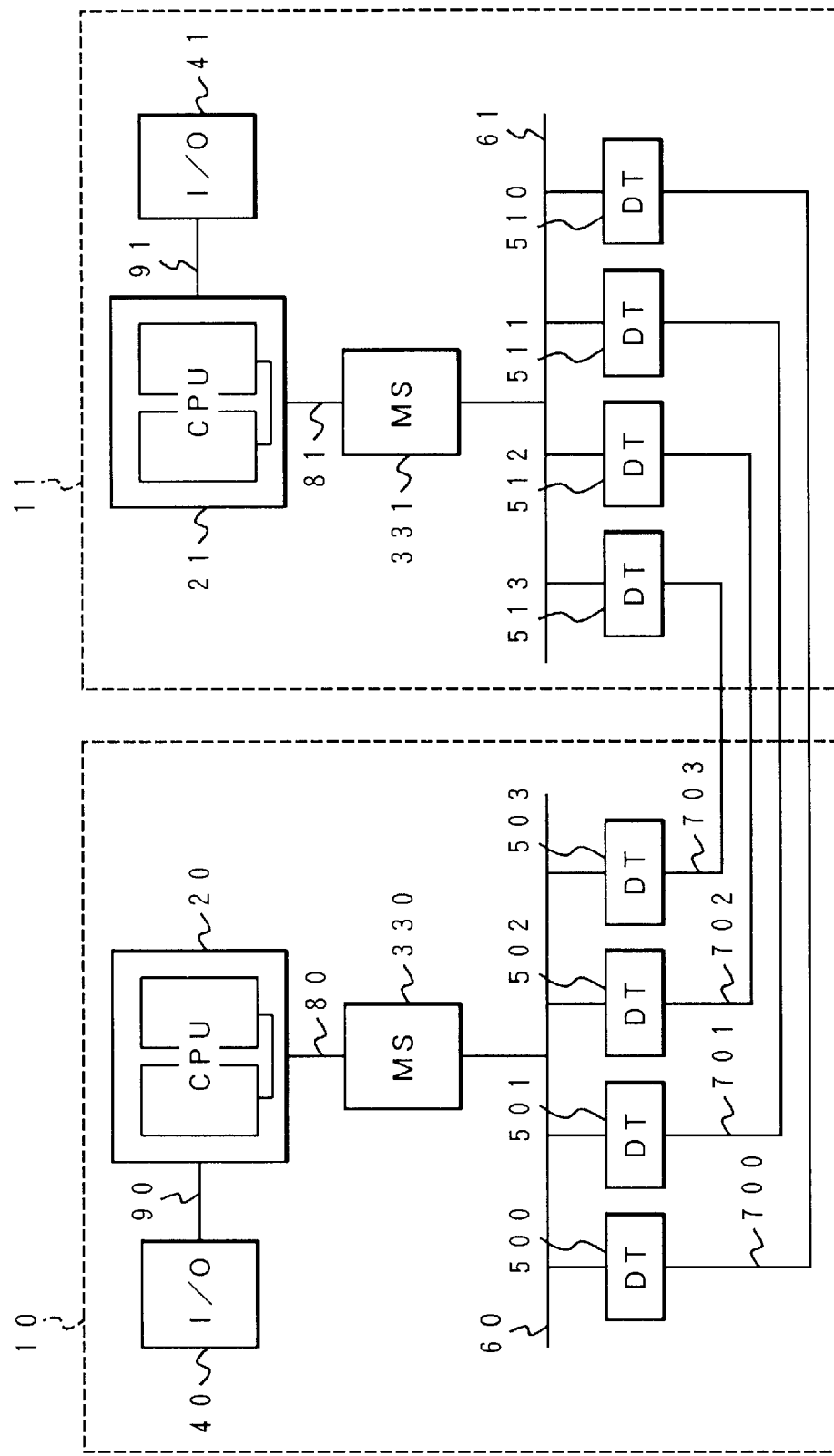
FIG. 17 is a block diagram of a dual computer system according to another modified form of the second embodiment of the invention.
Figure 18:
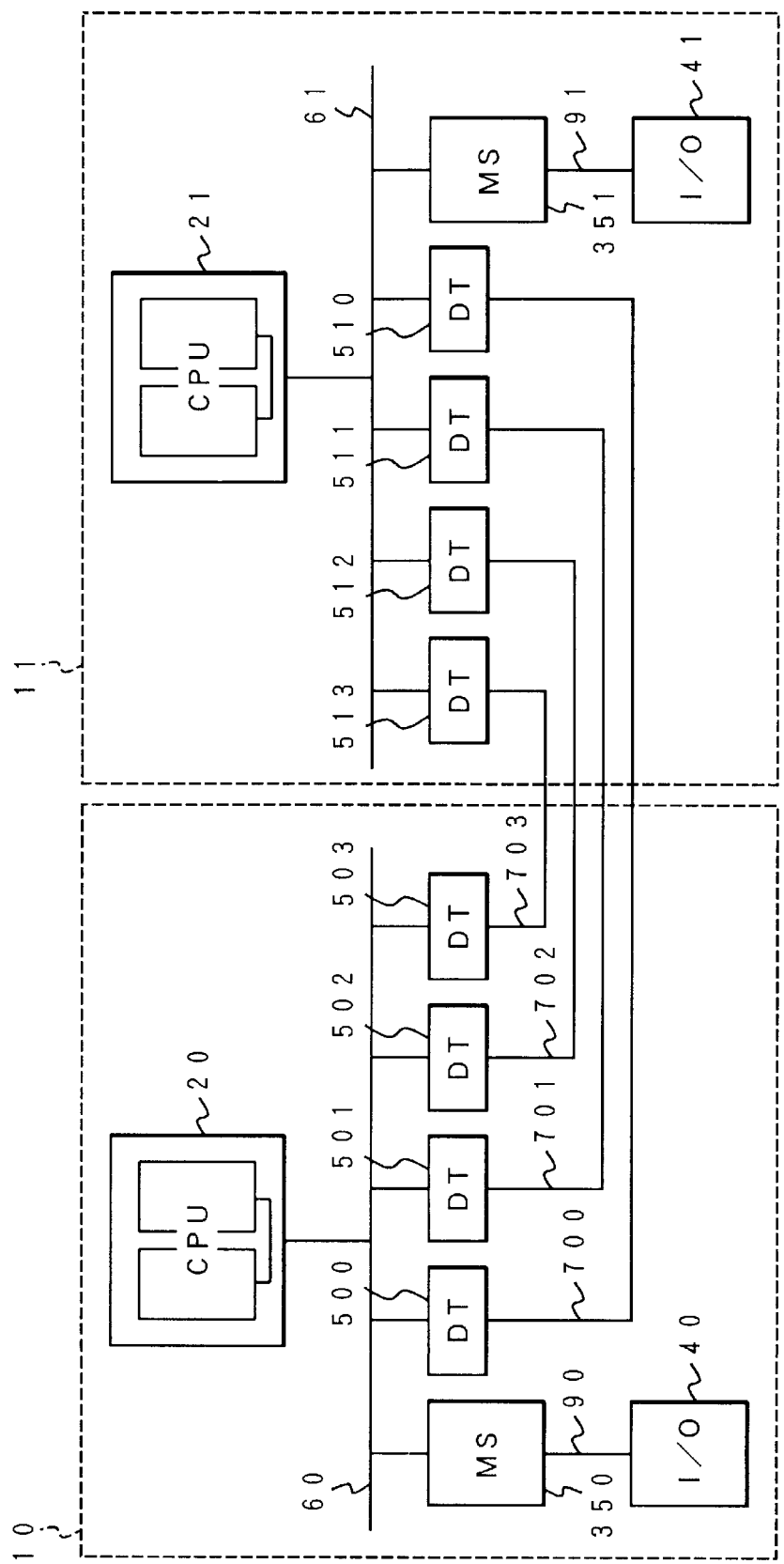
FIG. 18 is a block diagram of a dual computer system according to yet another modified form of the second embodiment of the invention.

Next, FIGS. 16 to 18 show modified forms of the second embodiment of the invention.

Figure 19B:
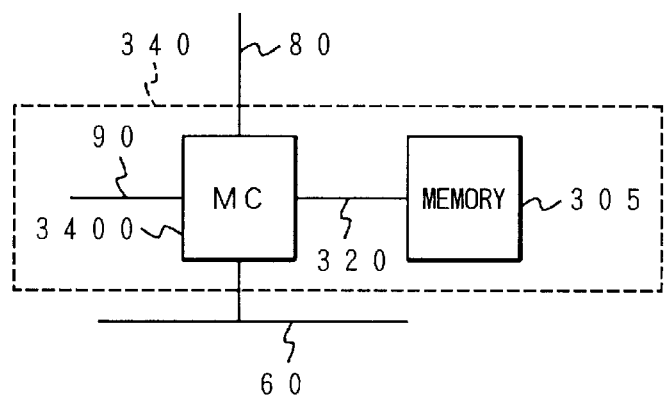
Figure 19C:
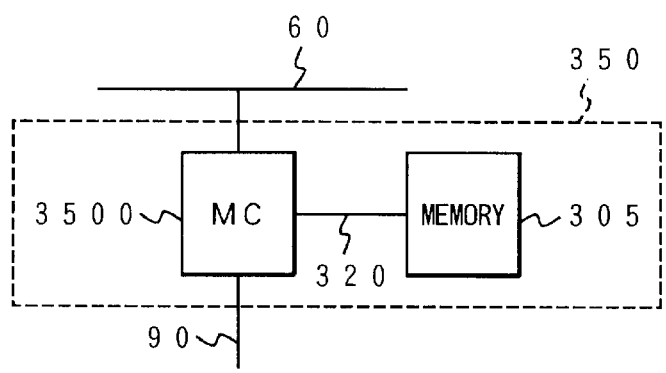

FIGS. 19A, 19B, and 19C are block diagrams showing the internal configurations of main storages shown in FIGS. 17, 16, and 18 respectively.

As seen in the figures, the system configurations are the same as the system configuration of the second embodiment except for connection locations of a CPU, main storage, and an I/O unit.

The difference between the system configurations shown in FIGS. 15 and 16 is that the I/O 40 is connected directly to the system bus 60 in the configuration in FIG. 15, whereas an I/O 40 is connected to an MS 340 in FIG. 16.

The configuration of the MS 340 is shown in FIG. 19B. The MS 340 comprises an MC 3400 and a memory 305, which are connected by a memory system bus 320. The MC 3400 is connected to a CPU 20 by a CPU bus 80 and to the I/O 40 by a bus 90. It is also connected to a system bus 60.

Thus, the MC 3400 contains the I/O bus in addition to a data transfer channel (connection signal lines to the system bus 60) compared with the MC 3300.

The system configuration can provide a system with fast memory access speed from the I/O 40.

The difference between the system configurations shown in FIGS. 15 and 17 is that the I/O 40 is connected directly to the system bus 60 in the configuration in FIG. 15, whereas an I/O 40 is connected to a CPU 20 by a bus 90 in FIG. 17. The configuration of the MS 330 is as shown in FIG. 19A.

The system configuration can provide a system having the CPU which can immediately block a memory access if it occurs from the I/O 40 at the memory copy time.

The difference between the system configurations shown in FIGS. 15 and 18 is that the MS 330 connected to the CPU 20 is connected directly to the system bus 60 in the configuration in FIG. 15, whereas an I/O 40 is connected to the MS 350 connected to a system bus 60 in FIG. 18.

The configuration of the MS 350 is shown in FIG. 19C. The MS 350 comprises an MC 3500 and a memory 305, which are connected by a memory system bus 320. The MC 3500 is connected to the system bus 60 and to the I/O 40 by a bus 90. It does not contain the CPU bus and is provided with the I/O bus 90 compared with the MC 3300.

The system configuration can also provide a system with fast memory access speed from the I/O 40.

However, the configurations differ from the configuration of the first embodiment in that the CPU, main storage, I/O unit, and data transfer units are not connected to one system bus 60, in which case the main storage must give a memory copy instruction upon receipt of a CPU instruction. Therefore, the main storage needs to include means for receiving a CPU instruction and giving a memory copy instruction.

Thus, in the dual computer system of the invention, a plurality of data transfer units can share the load of a memory copy executed at resynchronization. Data transfer throughput is enhanced by using a plurality of data transfer units; even if an access to the memory occurs consecutively, lowering of the system performance due to the time required for the memory copy operation does not occur.

The effect of decreasing the number of buffers is also produced to accomplish memory copy-performance equivalent to the conventional one. As described above, even if a fault occurs in one transfer unit, the data transfer channel can be flexibly changed by using another normal transfer unit, so that memory copy reliability is also improved.

Thus, according to the invention, when no fault occurs on the data transfer channels, the load of data transfer in the memory copy operation into the mate system is shared across a plurality of data transfer channels. That is, if four data transfer channels are provided, the data transfer throughput at the time of memory copy becomes four times that when one data transfer channel is used. On the other hand, if a fault occurs on one data transfer channel, the remaining normal data transfer channels are used to again execute data transfer. The configuration can shorten the single-system-operation time to completion of resynchronization, and further improves memory copy reliability. The time required for a memory copy can also be shortened, preventing the processing performance of the normal system from lowering.

Since data transfer channel assignment at the time of memory copy can be changed, a data transfer channel fault can be flexibly dealt with and the probability that memory copy failure will cause the system to stop can be decreased.

For example, if two data transfer channels are provided, the time required for a memory copy can be halved compared with the conventional system (simple dual system), in which case reliability remains unchanged compared with the conventional system. However, for example, if four data transfer channels each having a half throughput of the conventional system are provided, when all the data transfer channels are normal, a memory copy can be completed taking half the time compared with the conventional system; even if a fault occurs on up to any two of the data transfer channels, a copy can be made taking the same time as the conventional system, so that reliability against data transfer unit faults can be improved.

Thus, the invention can provide a dual computer system which comprises high-speed memory copy means with high reliability.

According to the invention, the load of a memory copy is shared over a plurality of data transfer channels to the mate system, thereby shortening the memory copy time and improving reliability against data transfer unit faults.

What is claimed is:

1. A dual information processing system comprising:
   first and second computer systems operating synchronously with each other, each of said computer systems comprising a central processing unit including means for detecting a fault occurrence in said each computer system, a data storage unit, an I/O unit, and a plurality of data transfer units for transferring data between said two computer systems, said data transfer units of said first computer system being connected to said data transfer units of said second computer system by a plurality of data transfer channels;

means for, in the event that a fault occurrence is detected in one of said computer systems but not in the transfer units thereof, assigning first address ranges said transfer units of a non-faulting computer system and transferring data stored in the data storage unit of the non-faulting computer system into the data storage unit of the computer system in which such fault has occurred;

means for, in the event that a fault occurrence is detected in the transferring units of one of said first or second computer systems, assigning second address ranges to said transferring units of a non faulting computer system and transferring data stored in the data storage unit of the non-faulting computer system into the data storage unit of the computer system in which such fault has occurred, wherein each of said data transfer unit includes a data transfer control section for detecting a fault occurring during data transfer, a transfer state storage section for storing a fault occurrence state at said data transfer unit, assigned address storage means for storing an address range assigned to said data transfer unit, a control section for detecting an access to said storage from said central processing unit if it occurs when data is transferred and determining whether or not an accessed address is contained in the address range specified by the contents stored in said assigned address storage means, and for sending data at the accessed address to the data transfer channel if the accessed address is contained in the address range stored in said address storage means, means for checking said transfer state storage section of the data transfer units used for the data transfer to determine if a fault occurs in said data transfer units, and if a fault occurs in any of said data transfer unit, assigning the address range to another normal data transfer unit for executing data transfer.

* * * * *